United States Patent
Singh et al.

(10) Patent No.: US 11,257,095 B2
(45) Date of Patent: Feb. 22, 2022

(54) VISUAL SENSOR-BASED MANAGEMENT OF A RETURN TRANSACTION

(71) Applicant: Toshiba Global Commerce Solutions Holdings Corporation, Tokyo (JP)

(72) Inventors: Ankit Singh, Morrisville, NC (US); Dean Frederick Herring, Youngsville, NC (US); Brad Matthew Johnson, Raleigh, NC (US); Jeffrey John Smith, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 874 days.

(21) Appl. No.: 15/299,208

(22) Filed: Oct. 20, 2016

(65) Prior Publication Data

US 2018/0114228 A1   Apr. 26, 2018

(51) Int. Cl.
*G06Q 30/00* (2012.01)
*G06K 9/00* (2006.01)
(Continued)

(52) U.S. Cl.
CPC ....... *G06Q 30/016* (2013.01); *G06K 9/00335* (2013.01); *G06K 9/00369* (2013.01);
(Continued)

(58) Field of Classification Search
CPC .................................................. G06Q 30/016
(Continued)

(56) References Cited

U.S. PATENT DOCUMENTS

| 4,866,661 A | 9/1989 | de Prins |
| 7,231,380 B1 | 6/2007 | Pienkos |

(Continued)

FOREIGN PATENT DOCUMENTS

| CA | 3041282 A1 | 4/2018 |
| WO | 2001067344 A1 | 9/2001 |
| WO | 2018075775 A1 | 4/2018 |

OTHER PUBLICATIONS

ConsumerReports, "How and Why Retail Stores Are Spying on You", ShopSmart: Mar. 2013, 4 pages <http://www.consumerreports.org/cro/2013/03/how-stores-spy-on-you/index.htm>.

(Continued)

*Primary Examiner* — Olabode Akintola
*Assistant Examiner* — Paul R Kloberg
(74) *Attorney, Agent, or Firm* — Patterson + Sheridan, LLP

(57) ABSTRACT

A method, computer program product, and system are disclosed for managing a return transaction within an environment having a plurality of purchasable item. The method acquires, using at least one visual sensor disposed within the environment, first image information including a first person and including a first item associated with the first person. The method identifies the first person using image analysis performed on the first image information. Further, the method determines, using image analysis performed on the first image information and based on one or more predetermined criteria, that the first item is eligible to be returned by the first person within the return transaction. Upon completion of one or more predefined return tasks specified for the first item within the return transaction, the method updates a first data structure representing an inventory of the environment to reflect the returned first item.

20 Claims, 12 Drawing Sheets

(51) Int. Cl.
    *G06Q 20/20*     (2012.01)
    *G06Q 20/40*     (2012.01)
    *G07G 1/00*     (2006.01)
    *G07F 7/06*     (2006.01)
    *G06K 9/62*     (2006.01)
    *G06Q 20/10*     (2012.01)
    *G06Q 20/24*     (2012.01)
    *G06Q 10/08*     (2012.01)

(52) U.S. Cl.
    CPC ..... *G06K 9/00597* (2013.01); *G06K 9/00771* (2013.01); *G06K 9/628* (2013.01); *G06Q 20/10* (2013.01); *G06Q 20/208* (2013.01); *G06Q 20/24* (2013.01); *G06Q 20/407* (2013.01); *G07F 7/06* (2013.01); *G07G 1/0063* (2013.01); *G06Q 10/087* (2013.01)

(58) Field of Classification Search
    USPC .......................................................... 705/39
    See application file for complete search history.

(56) References Cited

U.S. PATENT DOCUMENTS

| | | | |
|---|---|---|---|
| 7,376,601 B1 | 5/2008 | Aldridge | |
| 7,742,952 B2 | 6/2010 | Bonner et al. | |
| 8,036,946 B2 | 10/2011 | Angell et al. | |
| 8,104,682 B2* | 1/2012 | Junger | G07F 7/06 235/385 |
| 8,113,421 B2* | 2/2012 | Yepez | G07F 7/069 235/381 |
| 8,239,269 B2 | 8/2012 | Maraz | |
| 8,942,990 B2* | 1/2015 | Jankowski | H04N 7/18 705/1.1 |
| 2001/0037207 A1* | 11/2001 | Dejaeger | G06Q 20/10 705/39 |
| 2005/0033665 A1 | 2/2005 | Kumhyr | |
| 2009/0125442 A1* | 5/2009 | Otto | G06Q 20/10 705/39 |
| 2012/0310657 A1* | 12/2012 | Jankowski | H04N 7/18 705/1.1 |
| 2014/0052661 A1* | 2/2014 | Shakes | G06Q 10/0836 705/339 |
| 2014/0316919 A1* | 10/2014 | Li | G06Q 20/202 705/23 |
| 2014/0333761 A1* | 11/2014 | Porter | G07F 7/069 348/135 |
| 2015/0029339 A1 | 1/2015 | Kobres et al. | |
| 2016/0048798 A1 | 2/2016 | Meyer et al. | |
| 2016/0148209 A1* | 5/2016 | Hammond | G06Q 30/016 705/21 |
| 2018/0047006 A1* | 2/2018 | Johnson | G06Q 20/047 |
| 2018/0114228 A1 | 4/2018 | Singh et al. | |

OTHER PUBLICATIONS

Notification of Transmittal of the International Search Report and The Written Opinion of the International Searching Authority, or the Declaration for Application No. PCT/US17/57399 dated Jan. 16, 2018.

Canadian Office Action for Application No. 3041282 dated May 28, 2020.

Innovation, Science and Economic Development Canada Requisition by Examiner for Application No. 3041282 dated Mar. 1, 2021.

* cited by examiner

402 — STORE INVENTORY

| IDENTIFICATION | STATUS | DAYS UNTIL EXPIRED | # IN STOCK | # AVAILABLE | # ORDERED |
|---|---|---|---|---|---|
| ITEM A | FRESH | 25 | 10 + 2 | 10 + 1 | 0 |
| ITEM B | FRESH | 5 | 5 | 5 - 1 | 5 |
| ITEM C | EXPIRED | 0 | 20 | 0 | 20 |
| ITEM D | FRESH | 20 | 0 + 5 | 0 | 10 - 5 |
| ... | ... | ... | ... | ... | ... |
| ITEM n | V | W | X | Y | Z |

404, 406, 407, 408, 410, 412

414 — RETURNED INVENTORY

| ITEM I.D. | RETURN DATE | RECEIPT | ORIGINAL PACKAGING | CONDITION | RECALL | RETURNED BY |
|---|---|---|---|---|---|---|
| ITEM R | 05-05-16 | Y | Y | 100 | N | UNKNOWN |
| ITEM S | 04-29-16 | N | Y | 90 | N | CUSTOMER 2 |
| ITEM T | 04-15-16 | Y | N | 50 | N | EMPLOYEE 3 |

430 — CUSTOMER INFORMATION

432 — LOYALTY # : 0123456

| KNOWN PERSONS 434 |
|---|
| NAME 1 |
| NAME 2 |
| NAME 3 |

| ASSOCIATED PERSONS 436 |
|---|
| NAME 1 |
| CUSTOMER 3 |

| PAYMENT TYPES 438 |
|---|
| CC # : 0011223344 |
| CASH BALANCE $ 12.34 |

440 — VIRTUAL TRANSACTION

| ITEM I.D. 442 | QUANTITY 444 | LOCATION 446 | PROMOTION 448 | PURCHASED 450 |
|---|---|---|---|---|
| ITEM B | 1 | CART | 50 % | N |

452 — PREVIOUSLY COMPLETED TRANSACTIONS

| ITEM I.D. 454 | PURCHASE PRICE 455 | QUANTITY 456 | DISCOUNT 458 | PURCHASE DATE 460 | SOLD CONDITION 462 | SOLD LOCATION 464 | PAYMENT METHOD 466 | UNDER WARRENTY 468 |
|---|---|---|---|---|---|---|---|---|
| ITEM G | $ 10.99 | 1 | 0 % | 01-05-16 | NEW | 001 | CC # : 3344 | Y |
| ITEM H | $ 25.33 | 1 | 25 % | 02-09-16 | OPEN BOX | 214 | CASH | N |

FIG. 4B

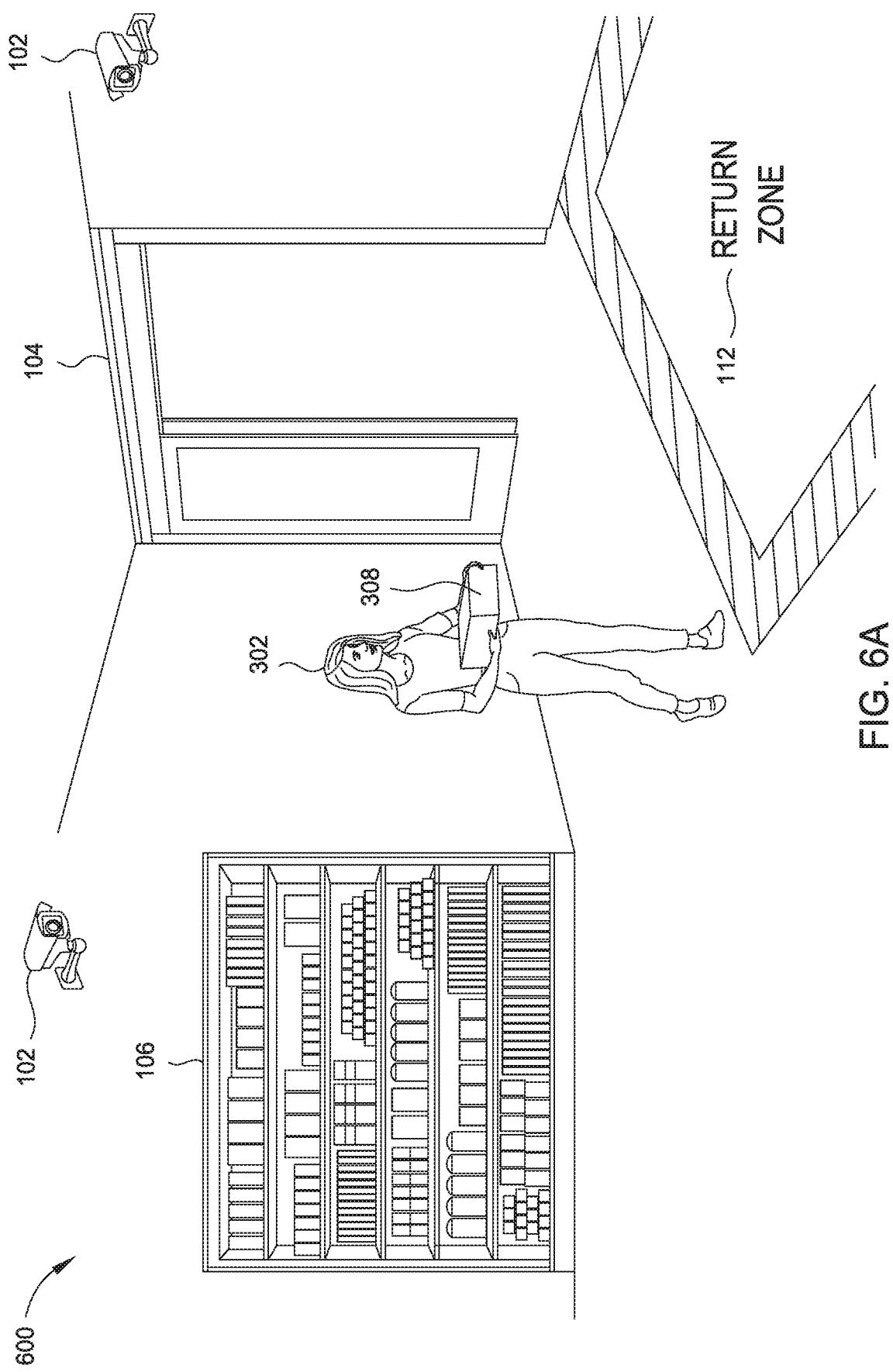

602 — IDENTIFICATION OF ITEM

| ITEM I.D. | DIMENSIONS MATCH 608 | ITEM SHAPE 610 | ITEM COLOR 612 | CONTAINER SHAPE 614 | CONTAINER COLOR 616 | GRAPHIC AND LETTERING MATCH 618 | IDENTIFICATION INFO 620 | WEIGHT 622 | MATCH SCORE 624 |
|---|---|---|---|---|---|---|---|---|---|
| ITEM 308 | 75 | SPHERICAL | BLACK & WHITE | CUBE | BLACK | 89 | NA | 12.0 | 95 |
| ITEM G | | SPHERICAL | BLACK & WHITE | CUBE | BLACK | | 987654 | 13.5 | |

604 — ITEM CONDITION

| ITEM I.D. 628 | CONTAINER CONDITION 630 | ITEM FUNCTIONING 632 | ITEM DAMAGE 634 | MISSING PARTS 636 | MISSING ACCESSORIES 638 | ITEM EXPIRED 640 | ITEM WEIGHT 642 | IDENTIFICATION INFO. 644 | KNOWN CUSTOMER 646 | CONDITION SCORE 648 |
|---|---|---|---|---|---|---|---|---|---|---|
| ITEM 308 | 85 | 100 | 5 | 0 | N | NA | 12.0 | NA | 0123456 | 90 |
| ITEM BR | 65 | 65 | 25 | 20 | Y | NA | 36.5 | 363625 | NA | 50 |

606 — ITEM RETURNABLE

| ITEM I.D. 650 | KNOWN CUSTOMER 652 | RECEIPT 654 | WITHIN RETURN PERIOD 656 | PURCHASE LOCATION 658 | RETURN REASON 660 | DISCOUNT 662 | ITEM CONDITION SCORE 664 | SOLD CONDITION 668 | UNDER WARRENTY 670 | RETURN SCORE 672 |
|---|---|---|---|---|---|---|---|---|---|---|
| ITEM 308 | 0123456 | NA | N | 001 | WRONG ITEM | 0 | 90 | 100 | Y | 86 |
| ITEM BR | NA | Y | Y | 114 | BROKEN | 20 | 50 | 65 | N | 92 |

FIG. 6C

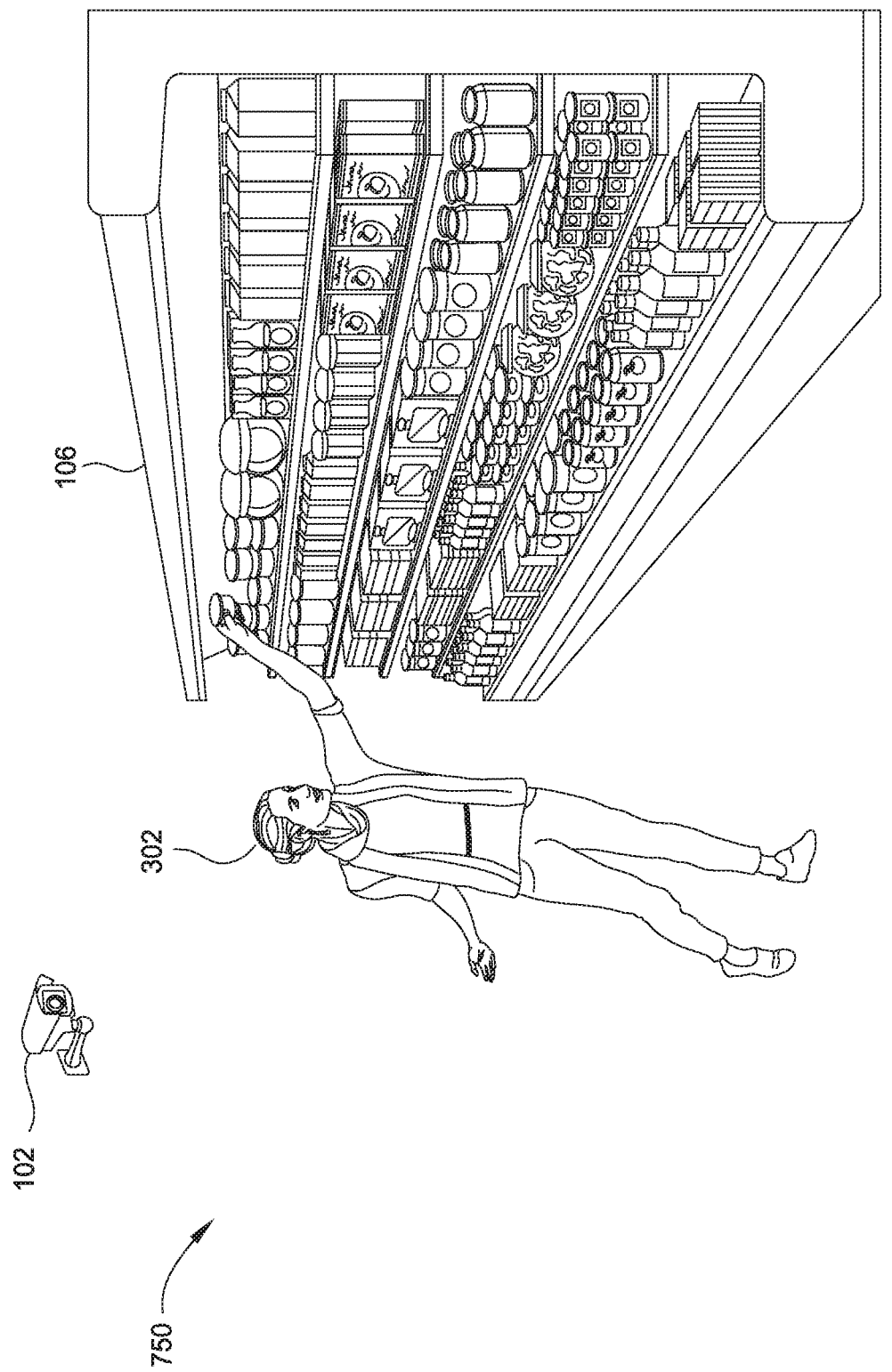

VISUAL SENSOR-BASED MANAGEMENT OF A RETURN TRANSACTION

CROSS-REFERENCE TO RELATED APPLICATIONS

This application is related to U.S. patent application Ser. No. 15/134,185, filed Apr. 20, 2016 and entitled "ASSOCIATING MULTIPLE PERSONS WITH A VIRTUAL TRANSACTION IN AN ENVIRONMENT". The related application is herein incorporated by reference in its entirety.

BACKGROUND

The present disclosure relates to an environment having a plurality of visual sensors disposed throughout, and more specifically, to techniques for managing a return transaction of items using the visual sensors.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 4A and 4B illustrate exemplary data structures related to maintaining virtual transactions within an environment, according to one embodiment.

FIGS. 6A-6C illustrate an exemplary return within an environment and exemplary data structures for the exemplary return, according to one embodiment.

FIGS. 7A and 7B illustrate an exemplary return within an environment, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects of the current disclosure relate to an environment capable of returning an item for a person within the environment. A number of different visual sensor devices may be employed within the environment and networked to a controller to monitor a person's interaction within the environment to return an item.

Using a system having one or more visual sensors within the environment, a retailer or other provider may compile and process image data to identify a person that intends to physically return a purchased item within the environment. The system may predict or infer the person's intent to return an item based on any number of visually observable actions, such as the person walking to a designated return area within the environment and/or interacting with a sales associate. Additionally or alternately, the system may attempt to determine the person's intent directly, such as by sending a notification to an electronic device associated with the person, and so forth. The system may be further configured to manage the inventory of items within the environment.

Using the system to streamline return transactions tends to reduce the amount of time spent by persons (e.g., customers and/or employees) involved with performing a return transaction. The system may further provide increased accuracy of the return transactions, when compared with conventional return transactions. The reduced time and/or improved accuracy tends to result in greater customer satisfaction, a more efficient use of employees, and improved accuracy. For example, by initiating and at least partially completing a return in real-time during a customer's transaction within the environment, a retailer may reduce or completely eliminate the need for staffed customer service areas, as the customer may simply interact with a designated return area to return an item or place the item in a designated location on a display unit within the environment. Using the visual sensor based system, a retailer can compile valuable data on the types of items being returned, reasons for the item being returned, the types of customers who regularly return items, and the condition items are being returned in. While generally discussed within the context of a shopping environment, such as a retail store or other commercial environment, it is contemplated that the techniques disclosed herein may be applied to other environments (some non-limiting examples include libraries, museums, classrooms, hospitals, etc.) to provide a similar experience for persons included therein.

Figure 1:
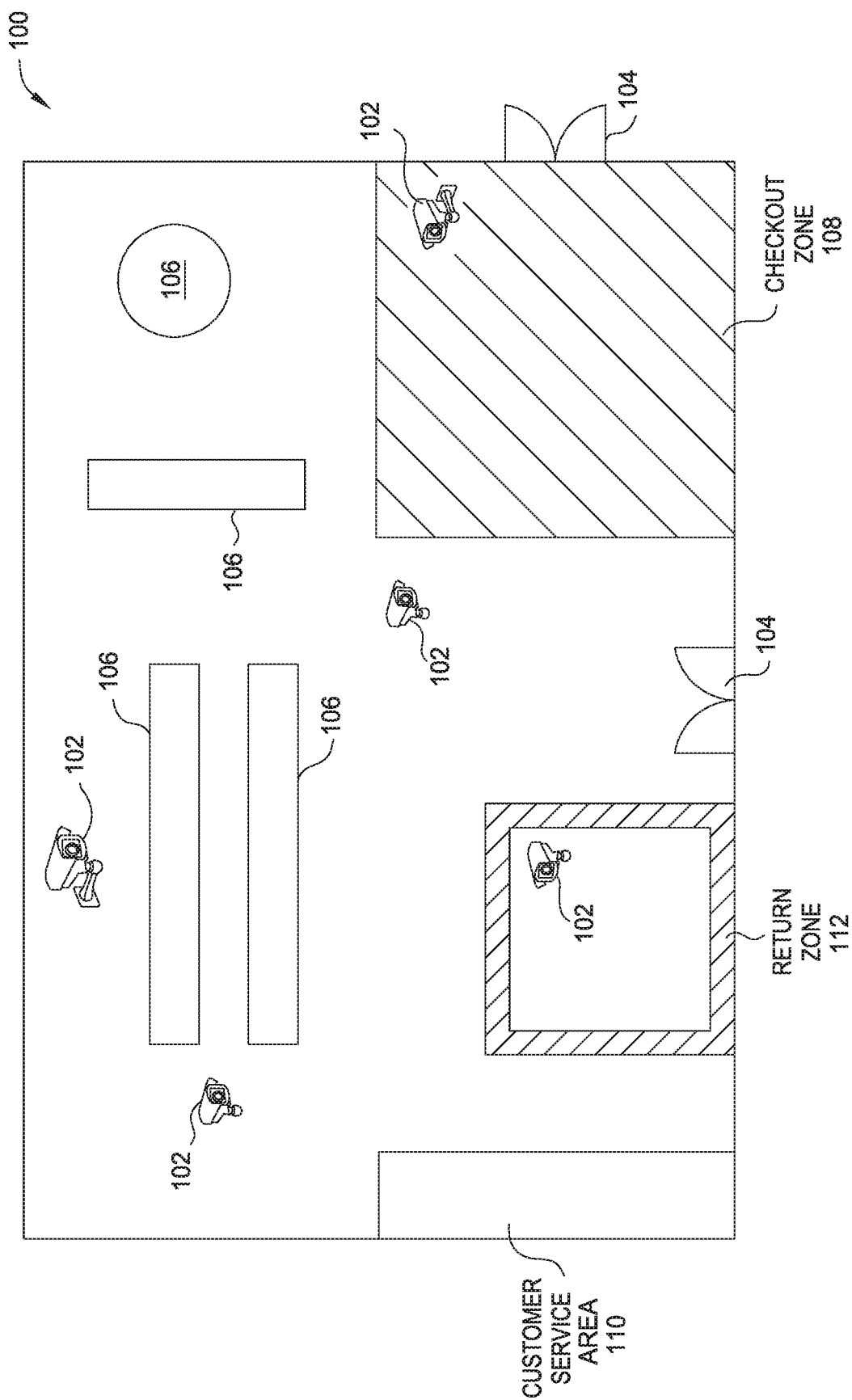
FIG. 1 illustrates an exemplary environment including a return zone, according to one embodiment.

FIG. 1 illustrates an exemplary environment including a plurality of purchasable items, according to one embodiment. Environment 100 is depicted as a top-down plan view of an exemplary commercial environment. The environment 100 may be physically and/or logically separated into different zones so as to allow zone-specific analysis to be performed. In an exemplary embodiment, the environment 100 includes a customer service area 110, a return zone 112, and a checkout zone 108. Other embodiments of environment 100 may have different numbers and/or types of zones. The environment 100 includes a plurality of visual sensors 102 disposed throughout the environment 100. Each of the visual sensors 102 includes one or more types of visual sensors such as visible light sensors, infrared (IR) sensors, and so forth. Although not shown, one or more other types of sensors may be disposed within the environment 100, such as audio sensors (e.g., microphones), pressure sensors, and so forth. In some cases, the other sensors may be collocated with the visual sensors 102. Further, other devices may be used with the visual sensors 102 such as speakers, displays, transmitters, and so forth. Generally, the visual sensors 102 may be disposed at any suitable location within the environment 100. Some non-limiting examples of locations include below, within, or above a floor of the environment 100, and within other structural components of the environment 100 such as walls or ceiling structures. In some embodiments, sensors may be disposed on, within, or near item display areas such as a display unit 106. As will be explained in greater detail below, the visual sensors 102 are used to identify and monitor a plurality of persons within the environment 100 and interactions between the plurality of persons and the purchasable items.

In an exemplary embodiment, at least some of the visual sensors 102 are oriented towards doorways 104 or alternate areas of ingress and/or egress in order to identify customers entering and/or exiting the environment 100, as will be explained in further detail in FIG. 3. At least some of the visual sensors 102 may be oriented towards the customer service area 110 and the return zone 112, as will be explained in further detail in FIG. 5 and FIG. 6A. Further, at least some of the visual sensors 102 may be oriented towards display units 106 so as to capture interactions between customers and purchasable items located on the display units 106 as will be explained in greater detail with FIGS. 7A and 7B. The visual sensors 102 enable a touchless checkout through checkout zone 108 so that a customer may purchase items from the environment 100 in a more efficient manner than typical checkout transactions.

Figure 2:
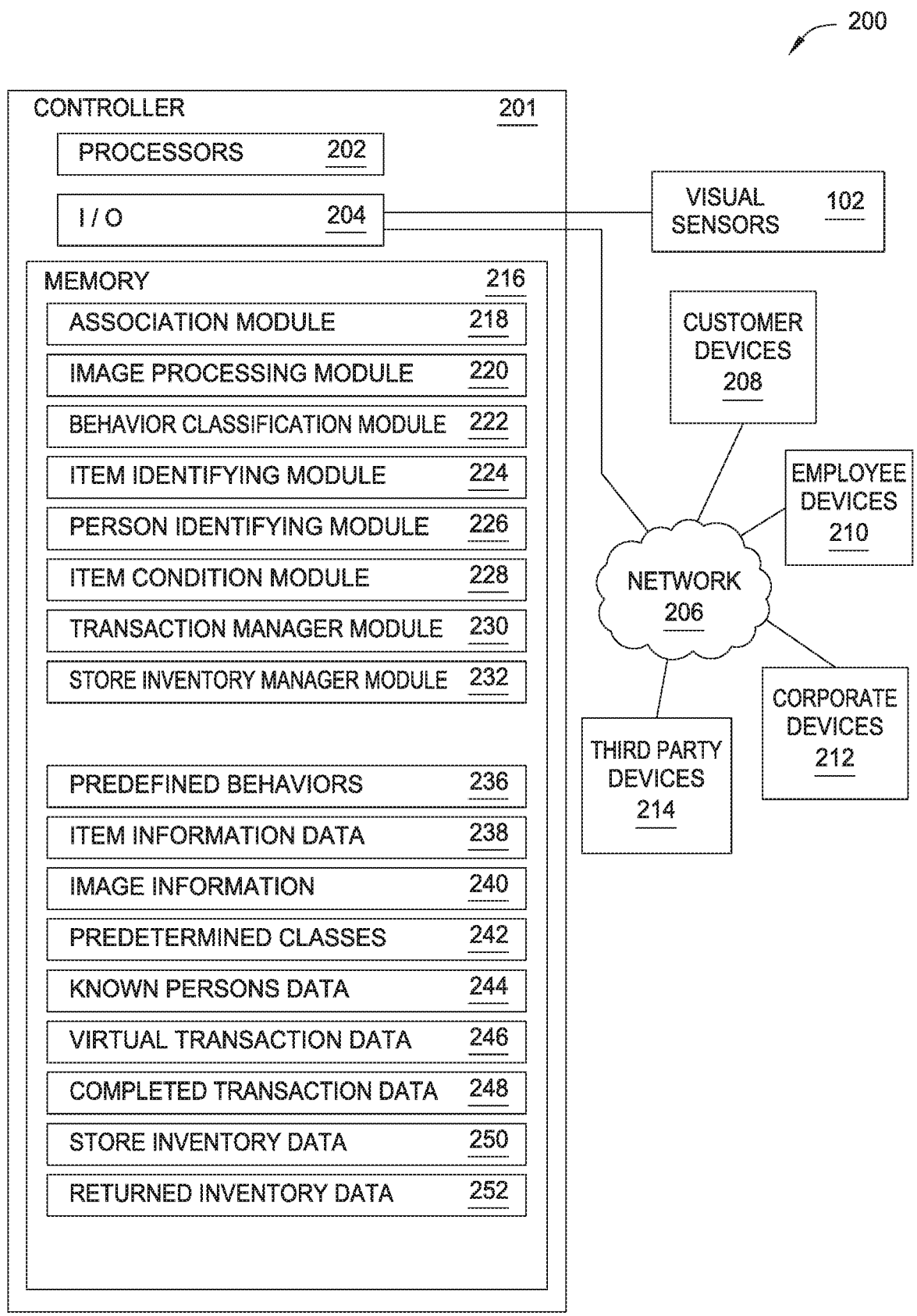
FIG. 2 is a block diagram illustrating operation of an exemplary system to facilitate a return of an item within an environment, according to one embodiment.

Turning to FIG. 2, an exemplary system 200 is shown for returning an item within a store, according to one embodiment. The system 200 comprises a controller 201. The controller 201 has one or more processors 202, input/output ports (I/O) 204, and a memory 216. In one embodiment, the controller 201 is implemented as a singular computing device having any suitable form. In other embodiments, controller 201 is distributed and includes a plurality of discrete computing devices that are connected through wired or wireless networking. The processors 202 may include any processing element suitable for performing functions described herein, and may include single or multiple core processors, as well as combinations thereof. Processors 202 may be included in a single computing device, or may represent an aggregation of processing elements included across a number of networked computing devices, which may include devices such as the customer devices 208, employee devices 210, and so forth.

The controller 201 communicates with the visual sensors 102 via the I/O 204. For example, the controller 201 may receive image data from the visual sensors 102 for processing. The controller 201 is connected to a network 206 to communicate with a plurality of computing devices, some of which may be disposed outside the environment 100. Network 206 may include one or more networks of various types, including a local area or local access network (LAN), a general wide area network (WAN), and/or a public network (e.g., the Internet). In one exemplary embodiment, the controller 201 communicates via network 206 with customer devices 208 to relay information helpful for customers within the environment 100 such as discounted items, coupons, item location information, step-by-step directions for returning an item, and so forth. The customer devices 208 may be mobile computing devices having any suitable form, such as handheld computing devices (e.g., tablets, smartphones) or worn computing devices (e.g., a head-mounted display, smartwatch). Further, the customer devices 208 may also be computing devices located within environment 100 that allow a customer to interact with the environment 100. For example, customer devices 208 may be a computer terminal (e.g., a kiosk, computer station) that a customer interacts with to facilitate the return of an item or request assistance from an employee of environment 100.

The controller 201 is further configured to communicate with employee devices 210, which may also include mobile computing devices and/or stationary computing devices (e.g., terminals, desktop computers). In some embodiments, the controller 201 communicates notifications to employee devices 210 indicating various conditions occurring within the environment such as an item running out of stock, a spill in an aisle, a customer needing assistance, and so forth. The controller 201 may also facilitate communication between multiple networked devices such as the customer devices 208 and/or the employee devices 210. For example, the controller 201 may receive information from a customer device 208 indicating that a customer needs help returning an item. The controller 201 may then communicate to an employee device 210 the location of customer device 208, as well as the problem to be solved.

The controller 201 may also communicate with one or more corporate devices 212 to facilitate ordering of items, sending customer data for analysis, returning items from other stores, and so forth. The corporate devices 212 are computing devices having any suitable form, such as handheld computing devices (e.g., tablets, smartphones), worn computing devices (e.g., an optical head-mounted display, smartwatch), or stationary computing devices (e.g., terminals, desktop computers). The controller 201 may communicate with third party devices 214, such as computing devices associated with vendors, to order items, communicate status of shipments, communicate problems with items, etc. The third party devices 214 are computing devices having any suitable form, such as handheld computing devices (e.g., tablets, smartphones), worn computing devices (e.g., an optical head-mounted display), or stationary computing devices (e.g., terminals, desktop computers).

Memory 216 may include a variety of computer-readable media selected for their size, relative performance, or other capabilities: volatile and/or non-volatile media, removable and/or non-removable media, etc. Memory 216 may include cache, random access memory (RAM), storage, etc. Storage included as part of memory 216 may provide a non-volatile memory for the networked computing devices (e.g., employee devices 210, corporate devices 212), and may include one or more different storage elements such as Flash memory, a hard disk drive, a solid state drive, an optical storage device, and/or a magnetic storage device. Memory 216 may be included in a single computing device or may represent an aggregation of memory included in a plurality of devices.

For simplicity, the following paragraphs reference specific functional modules and data in explaining the functionality of controller 201, but are not intended to limit the embodiments of the present disclosure. The memory 216 stores a plurality of modules generally comprising program code, which when executed by the processors 202, perform a variety of functions for administering the environment 100. It is to be understood that each module and data are generally capable of communicating with all other modules and data within memory 216, such as through transmitted and received signals and/or shared portions of memory 216. The controller 201 encompasses the functionality of all modules and data described in the following paragraphs.

An image processing module 220 receives image information 240 from visual sensors 102, and performs image processing on the image information 240 according to known techniques. The image information 240 may be in any form suitable for identifying persons, items, and behaviors within the environment, such as full-motion video, still frames, etc. An association module 218 analyzes image information 240 from visual sensors 102 and/or data from image processing module 220 to determine whether to associate or disassociate multiple shoppers.

Item identifying module 224 analyzes image information 240 from visual sensors 102 and/or data from image processing module 220 to determine the identity of an item within the environment 100. Item identifying module 224 may identify the item based on visually observable properties of a container holding the item, based on properties of the item itself, a combination of the properties of the item inside and outside of its respective container, and so forth. Item identifying module 224 may use attributes of the item and/or container such as size, shape, weight, color, material (e.g., plastic, cloth, leather, etc.), text (e.g., brand name, item name, advertising language, etc.), graphics (e.g., logos, pictures, etc.), identifying codes (e.g., Universal Product Code, Quick Response Code, etc.), identifying tags (e.g., clothing tag, hang tags, etc.), identifying labels (e.g., International Standard Book Number, International Standard Serial Number, etc.), and electronic identifier (e.g., Radio Frequency Identification, magnetic strip, smart cards, etc.). In one exemplary embodiment, item identifying module 224 compares the item's attributes to attributes within item information data 238 to determine the item's identity. The controller 201 may add and/or remove items as necessary to/from the item information data 238 in order to keep item information data 238 up to date. In one exemplary embodiment, item information data 238 is updated via network 206 from corporate devices 212 and/or the internet. In another exemplary embodiment, the item identifying module 224 may determine, based upon the identified attributes, that the item is not a part of the item information data 238. In some cases, the item identifying module 224 adds a new entry to the item information data 238 so the item may be identified in the future.

Person identifying module 226 analyzes image information 240 from visual sensors 102 and/or data from image processing module 220 to determine which of a plurality of predetermined classes 242 a person within the environment 100 is a member. Some non-limiting examples of predetermined classes 242 include a customer, an employee, a vendor, etc. The person identifying module 226 identifies persons within the environment 100 by analyzing image information 240 from visual sensors 102 and/or data from image processing module 220 to identify physical traits of persons such as gender, height, hair color, eye color, clothing, and so forth. The person identifying module 226 compares the aforementioned traits with known persons data 244 to determine if the identified person is a known person. In one example, the person identifying module 226 may recognize a person as an employee within predetermined classes 242 having physical traits that match employee "John Doe" in known persons data 244. Thus, person identifying module 226 identifies the person as employee "John Doe," and controller 201 can now identify "John Doe" throughout the environment 100. In another example, person identifying module 226 may recognize the person as a customer within a particular predetermined class 242, but does not have traits matching the person in known persons data 244. The person identifying module 226 may identify the customer using a place holder such as "Customer 1," and controller 201 can now identify "Customer 1" throughout the environment 100.

Item condition module 228 determines the condition of items within the environment 100 by analyzing image information 240 from visual sensors 102 and/or data from image processing module 220. The item condition module 228 may determine the condition of an item based on the item's attributes, such as damage to the item, the condition of the item's container, whether the item is expired (e.g., food or medication past its expiration date), and so forth. In one exemplary embodiment, the item condition module 228 compares the current condition of the item with original condition information representing the item's condition when purchased from the environment 100. The original condition information may represent information specific to the item, e.g., based on image information captured at the time of sale of the item, or may represent a default original condition for all items of that type. In this manner, the item condition module 228 can recognize that although an identified item has some damage, the item is substantially in the same condition as when the item was purchased. That is, the item condition module 228 can recognize that an item's "ideal" condition for return does not necessarily mean the item is undamaged.

Transaction manager module 230 monitors and adaptively updates the various transactions for each of the persons within the environment 100. The transaction manager module 230 uses data from person identifying module 226 to create virtual transaction data 246 for each of the identified persons within environment 100. Virtual transaction data 246 contains dynamically updated information related to transactions between the person and the environment 100, such as items associated with the person, the number of items, and so forth.

A behavior classification module 222 analyzes image information 240 from visual sensors 102 and/or data from image processing module 220 to identify one or more predefined behaviors 236 by identified persons within the environment 100. The predefined behaviors 236 comprise behaviors associated with interacting with items, which may include direct interactions of the person with one or more items and/or behaviors which generally increase or decrease a likelihood that the person will interact with the item(s). Further, the predefined behaviors 236 may comprise behaviors associated with returning an item, which may include direct interactions with item(s) and/or zones within the environment 100, moving within environment 100 to subsequently interact with an item and/or zone, and so forth. Some non-limiting examples of predefined behaviors 236 include moving towards a display unit, adding an item to a display unit, removing an item from a display unit, holding an item, gesturing towards an item, moving within a designated zone, interacting with a customer service area, walking within environment 100, and so forth. The transaction manager module 230 uses data representing the identified predefined behaviors 236 to add/remove items from a person's virtual transaction data 246.

Transaction manager module 230 is further configured to monitor and/or store completed virtual transactions for each of the persons in the environment 100. The completed transaction data 248 stores information related to virtual transactions that have been completed (e.g., items purchased by a customer) within the environment 100. The completed transaction data 248 comprises purchase confirmation information, which may include the quantity of the item sold, the date the transaction was completed, the person associated with the transaction, payment method used, whether the item was sold on sale, the condition of the item at time of sale, the store identification, a transaction identification, shipping information, and so forth. The transaction manager module 230 may use the completed transaction data 248 to determine whether an item a person is attempting to return to environment 100 meets one or more predetermined criteria for being returned, as will be explained in more detail in FIGS. 5 and 6A-6C.

The transaction manager module 230 and/or the store inventory manager module 232 are configured to monitor returned inventory within the environment 100. Returned inventory data 252 comprises information on the various items that have been returned within environment 100. Some non-limiting examples include item identification, return date, whether a receipt was provided by the customer during the return, whether the item is in the original packaging, condition of the item, whether a recall from the manufacturer exists for the item, the store the item was purchased from, and so forth. When a person returns an item within the environment 100, the transaction manager module 230 and/or the store inventory manager module 232 updates the returned inventory data 252 as necessary to reflect the returned item.

Store inventory manager module 232 monitors the store inventory data 250 within the environment 100. Store inventory data 250 comprises information on the various items within environment 100. Some non-limiting examples include number in stock, number available, number ordered, and so forth. Store inventory manager module 232 may use data from behavior classification module 222 to update the store inventory data 250 based on the behavior associated with the identified person. The transaction manager module 230 may notify store inventory manager module 232 that an item has been added/removed from a person's virtual transaction data 246, and the store inventory module 228 updates the store inventory data 250 as necessary. Further, store inventory manager module 232 may be capable of tracking specific items throughout environment 100 such that controller 201 knows the location of all items at any given time. Thus, the store inventory manager module 232 is configured to monitor various items within the environment 100 in real-time.

Figure 3:
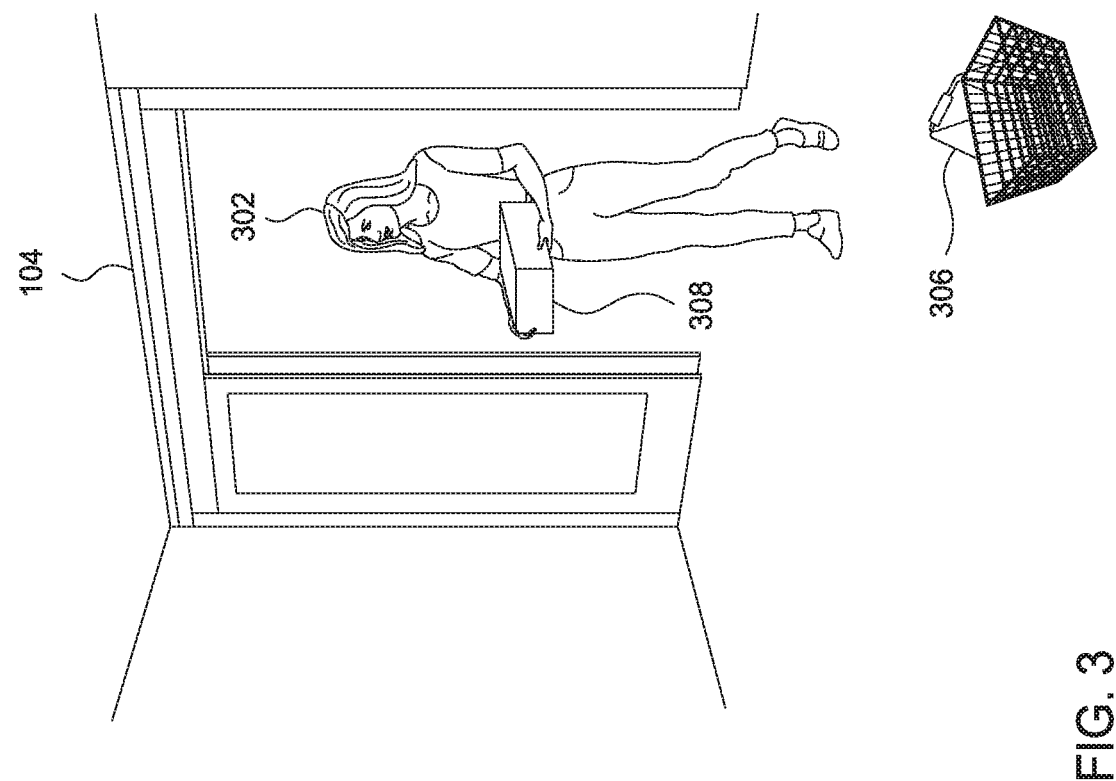
FIG. 3 illustrates an exemplary identification of a person within an environment, according to one embodiment.
Figure 3:
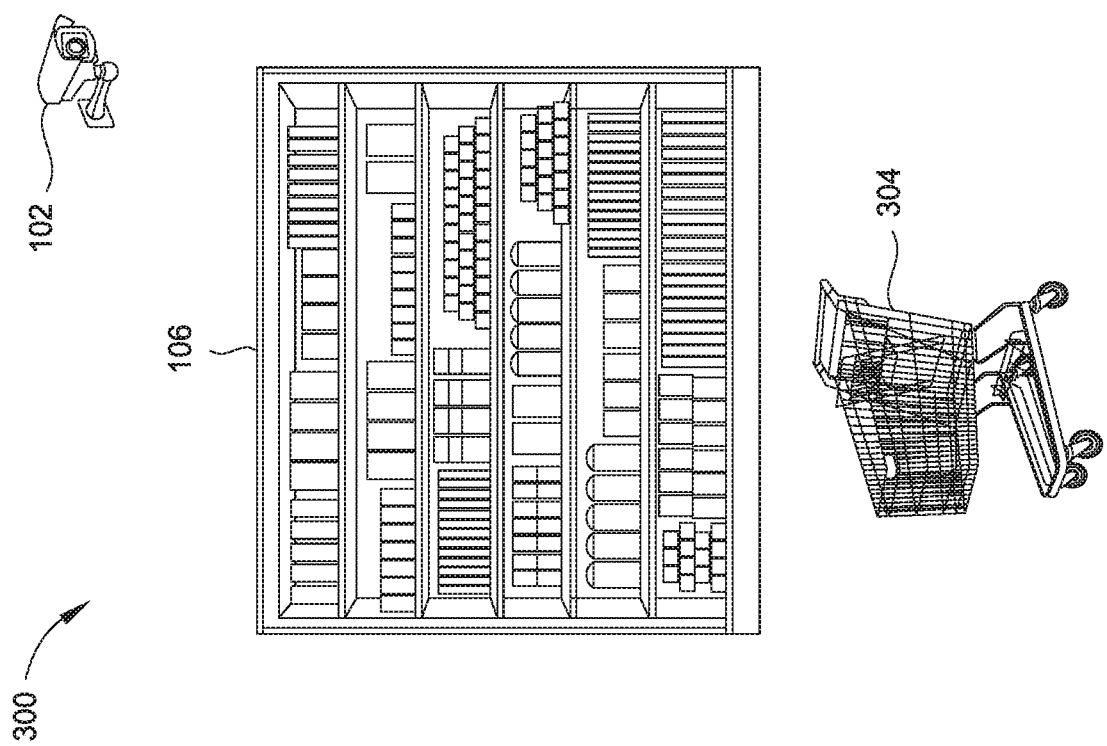

Turning to FIG. 3, an exemplary identification of a person within an environment is illustrated, according to one embodiment. Generally, view 300 illustrates exemplary operation of the controller 201 (and more specifically, the person identifying module 226) of FIG. 2 within the environment 100. As shown, a customer 302 is entering through doorway 104 into environment 100 carrying an item 308. While a single customer 302 is shown for simplicity, the techniques discussed herein may apply to multiple persons within the environment 100. In an exemplary embodiment, as customer 302 enters through doorway 104 into the environment 100, at least one of the visual sensors 102 is oriented to acquire image information 240 (FIG. 2) including the customer 302. The acquired image information 240 may be used by any of the aforementioned modules, such as image processing module 220 and/or person identifying module 226, to identify the customer 302. Additionally, the controller 201 may be further configured to visually identify transactional items used by the customer 302 within the environment 100, such as a shopping cart 304 and/or shopping basket 306. Based on visually observed interactions of the customer 302 with the shopping cart 304 and/or the shopping basket 306, the controller 201 may associate the shopping cart 304 and shopping basket 306 (and any items stored therein) with customer 302 for the associated virtual transaction.

The person identifying module 226 may take into account various visually observable attributes of the customer 302 when determining the identification. Some non-limiting examples include gender, age, height, weight, hair color, eye color, skin tone, and tattoos. The person identifying module 226 may perform identification based one or more additional attributes, such as a time of day, clothing worn by the customer 302, jewelry, and so forth. For example, the person identifying module 226 determines that the customer 302 is female, approximately 5 feet tall, has long brown hair and blue eyes, is approximately 32 years old, and entered the environment 100 at 6:00 P.M. In another example, the person identifying module 226 may perform identification based on the presence of a customer device 208 (FIG. 2) such as a smartphone. The customer device 208 may notify the controller 201 via network 206 that customer 302 has entered the environment 100. Alternatively, the controller 201 may recognize the customer device 208 as a device previously registered in known persons data 244 (FIG. 2), and person identifying module 226 may identify customer 302 based on this association. In some embodiments, the determined attributes can be collected anonymously (i.e., without association with any personally identifying information) to protect and respect customer privacy, but this is not a requirement. For example, the person identifying module 226 may use some or all of the determined attributes to identify customer 302 as "Customer A." After identifying "Customer A," in some cases the person identifying module 226 deletes some or all of the determined attributes, as the controller 201 may subsequently track the customer 302 as "Customer A." In this way, the controller 201 need not store all determined information related to customer 302 once identified. Rather, a placeholder can be used to track customer 302 and the virtual transaction can be associated with the placeholder.

In another exemplary embodiment, customer 302 has previously provided information to the controller 201 and/or allowed the controller 201 to store information on customer 302. For example, after recognizing the various attributes of the customer 302, the person identifying module 226 may recognize the identified customer 302 as a known person (i.e., customer 302 is a loyalty member of, or has been within, the environment 100 previously). Thus, the person identifying module 226 may use the visually determined attributes to associate the customer 302 with a specific loyalty member (e.g., "Jane Doe" having loyalty number "0123456"). While FIG. 3 has been described as assuming the identified person is a customer for simplicity, it should be understood that person identifying module 226 determines which predetermined class 242 the identified person within the environment 100 belongs. That is, person identifying module 226 identifies customers as well as other classes of persons within the environment 100 such as employees, vendors, etc.

FIGS. 4A-4B illustrate exemplary data structures related to maintaining virtual transactions within an environment, according to one embodiment. The store inventory 402 represents one example of store inventory data 250 stored in controller 201 of FIG. 2. The store inventory manager module 232 (FIG. 2) may monitor the number of purchasable items being sold to customers or stocked by employees via store inventory 402 to keep an up-to-date list of the items within the environment 100 in real-time. The store inventory 402 contains a plurality of items A, B, C, D, . . . , n. Any number of items may be tracked by the store inventory 402 and items A-D are used for simplicity. The store inventory 402 may comprise columns relating to particular properties of each item such as identification 404, status 406, days until expired 407, number in stock 408, number available 410, and the number ordered 412. The identification 404 may identify a purchasable item by a visual identifier such as a Universal Product Code (UPC) or quick response (QR) code, a location of the purchasable item within the environment 100, and/or any combination of the attributes described with regards to the item identifying module 224 (FIG. 2). The store inventory manager module 232 may track the status 406 of purchasable items within environment 100, such as if the item is past its expiration date or is still fresh.

Further, the store inventory manager module 232 may monitor the days until expired 407 of the individual items. For example, the store inventory manager module 232 may recognize Item B only has five days until expired 407 and may preemptively order more of Item B so as to replace Item B when the status 406 changes from "Fresh" to "Expired." This may allow the environment 100 to increase customer satisfaction by reducing the amount of time items are out of stock.

The store inventory manager module 232 adaptively updates the number in stock 408 compared to the number of items available 410 within the environment 100. For example, when a customer 302 (FIG. 3) adds one (1) of Item B to their virtual transaction, the number available 410 for Item B is reduced by one (1), but the number in stock 408 for Item B still has five (5) items in stock 408 as the customer 302 has not yet completed the transaction. In this way, the store inventory manager module 232 is able to track items as soon as the item is associated with a customer until the customer completes the transaction. The store inventory manager module 232 may further track a number ordered 412 of particular items. For example, the system may recognize item C has a status 406 of "Expired" so it is no longer available for sale, which is reflected in item C having zero (0) as the number available 410. The store inventory manager module 232 may order more, twenty (20) in this example, to replenish the stock which is reflected by the number ordered 412. Thus, the store inventory manager module 232 is capable of keeping track of the various purchasable items within the environment 100 using store inventory 402 in real-time.

An exemplary data structure for returned inventory data 252 (FIG. 2) is illustrated in FIG. 4A. The store inventory manager module 232 may keep track of the returned items within the environment 100 in real-time. Returned inventory 414 contains a plurality of items R, S, and T. While items R, S, and T are used for simplicity, any amount of items may be tracked by the returned inventory 414. The returned inventory 414 may comprise columns relating to particular properties of each item such as identification 416, return date 418, receipt 420, original packaging 422, condition 424, recall 426, and whom the item was returned by 428. The identification 416 may identify a purchasable item by a visual identifier such as a Universal Product Code (UPC) or quick response (QR) code, a location of the purchasable item within the environment 100, and/or any combination of the attributes described with regards to the item identifying module 224 (FIG. 2). The store inventory manager module 242 may track the return date 418 of the various items. Some non-limiting examples of how the store inventory manager module 242 may use the return date are to ensure the item was returned in the proper timeframe, the item is promptly returned to the manufacturer, the item is made available for sale within a specific time period, and so forth.

The store inventory manager module 232 may track whether an item was returned with or without a valid receipt 420. Some non-limiting examples of a receipt 420 include a paper receipt, an electronic receipt, and so forth. In one exemplary embodiment, the receipt 420 is a previously completed transaction from environment 100 that is stored in completed transaction data 248 (FIG. 2), which will be explained in more detail with regards to FIG. 4B. The store inventory manager module 232 may also track whether an item was returned in the original packaging 422, and take appropriate action as necessary. For example, the environment 100 may have different return policies and/or procedures for items returned with a receipt compared to those items returned without a receipt, as well as for items returned in their original packaging.

The store inventory module 232 may track the condition 424 of items that are returned. In one exemplary embodiment, the condition 424 is a weighted score based upon several variables provided by the item condition module 228 (FIG. 2), as will be discussed in more detail with regards to FIG. 6C. In one embodiment, the condition 424 score is on a one hundred (100) point scale, with a score of one hundred (100) indicating the item is substantially in perfect and/or a brand new condition, while a score of zero (0) indicates the item is destroyed and/or in the worst possible condition. As shown, item R has a condition 424 score of one hundred (100), which indicates that item R is in perfect condition. Item S has a condition 424 score of ninety (90), which indicates that item S is in almost perfect condition, but has some minor deficiencies which lowered the condition 424 score. Item T has a condition 424 score of fifty (50), which indicates that item T is in fair condition and in some cases may be unreturnable. While a one hundred (100) point scale has been used, this is meant as one non-limiting example. Condition 424 may alternately use any suitable scale and/or logic for evaluating and/or representing items' conditions. The store inventory module 232 may also keep track of whether a recall 426 has been made by a manufacturer of an item. In this manner, the environment 100 may execute a different return procedure for a recalled item as compared to a standard return. For example, if an item has been recalled, the item may be ineligible for a return within the environment 100 and the customer may need to contact the manufacturer directly.

The store inventory module 232 may track whom the item was returned by 428 within environment 100. The store inventory module 232 may store the person's name, a loyalty number, an employee identification number, and so forth. In one exemplary embodiment, the controller 201 (FIG. 2) may use the returned by 428 data to determine if a person who returns the item is the person who purchased the item. In another exemplary embodiment, the environment 100 may use the returned by 428 data to monitor returns to prevent fraud. For example, if a customer has returned a large number of items to environment 100 in a short period of time, the controller 201 may recognize the situation and notify an employee of environment 100 to closely scrutinize a returned item to prevent fraudulent transactions.

Turning to FIG. 4B, an exemplary data structure for individual customer information 430 is illustrated. The customer information 430 contains data on associated persons 436 with the customer and the virtual transaction 440. Associated persons 436 are persons whom the association module 218 (FIG. 2) recognizes should be associated with a single virtual transaction, such as members of a family being on a single transaction. The virtual transaction 440 may contain information on items such as item identification 442, quantity 444 of the item, location 446 of the item such as in a cart 304 (FIG. 3), a promotion 448 such as a discount, and whether the item has been purchased 450. The transaction manager module 230 (FIG. 2) may add an item to the virtual transaction 440 (or remove an item from the virtual transaction 440) based on the customer's visually observed interactions with purchasable items.

Customer information 430 may contain additional information associated with a customer such as known persons 434, loyalty number 432, and payment types 438. Known persons 434 contains information on persons having visually observed association(s) with an individual customer or were previously added to customer information 430 by an individual customer. As shown, customer information 430 contains information on three known persons 434: Name 1; Name 2; and Name 3. The known persons 434 represents one or more identified persons with whom the customer enters and/or exits the environment 100, as well as associates with while in the environment 100. The known persons 434 may generally include individuals such as spouses, family members, friends, co-workers, and so forth. The known persons 434 for a particular customer may be defined based on the associations of the customer with each of the identified persons relative to a predefined threshold amount. In one non-limiting example, an identified person may be defined as a known person 434 when the identified person enters the environment 100 with the customer more than a threshold number of times (e.g., two or more times). In another non-limiting example, an identified person may be defined as a known person 434 when the incidence of an identified person entering the environment 100 with the customer is greater than a threshold percentage of the number of customer's entrances in the environment 100 (e.g., 10%). The association module 218 (FIG. 2) may store information on the various known persons 434 so as to better associate the known persons 434 with the customer 430 on a single virtual transaction 440. The association module 218 distinguishes between known persons 434 and associated persons 436 to encompass situations where a person associated with the customer is not a known person.

In one exemplary embodiment, the controller 201 (FIG. 2) associates one of the known persons 434 with a previously completed transaction 452 of the customer. In other words, a customer may purchase an item, and a known person 434 of the customer is authorized to return the item later. The controller 201 may treat the known person 434 as if they are the customer returning the item and take actions necessary to facilitate the return of the item. This may be the case even where the item being returned was not previously associated with the known person 434. In this manner, the controller 201 allows the known person 434 to return the item seamlessly even though the known person 434 did not purchase the item.

Customer information 430 contains information on different payment types 438. As shown, payment types include a credit card (CC #) as well as a cash balance stored with the environment 100, but may include any suitable alternate payment method, such as a virtual currency. For example, a customer may have associated credit card information with their loyalty number 432 and deposited cash with the environment 100. Payment information included in payment types 438 may allow the customer to seamlessly checkout. For example, as the customer interacts with purchasable items and/or transactional items within the environment 100, the transaction manager module 230 (FIG. 2) may add items to the customer's virtual transaction 440. The customer may then proceed to checkout zone 108 as shown in FIG. 1. Once the customer has entered the checkout zone 108, the transaction manager module 230 may recognize the customer stored a payment type 438 and automatically charge or debit the selected payment type 438 for the items included in the virtual transaction 440. In this manner, a purchase transaction is completed between the environment 100 and the customer without the need to complete conventional checkout processes.

Once a virtual transaction 440 is completed, customer information 430 may store the information of the previously completed transactions 452. An exemplary data structure for previously completed transactions is shown in FIG. 4B. The transaction manager module 230 (FIG. 2) may keep track of virtual transactions 440 that have been previously completed for customers. The previously completed transactions 452 contains transactions for two previously purchased items G and H. While two items are used for simplicity, any number of items may be tracked in the previously completed transactions 452. Additionally, the previously completed transactions 452 may store entire transactions, or receipts, instead of the individual items. The previously completed transactions 452 contains information such as the item identification 454, the quantity 456 of the item purchased, any discount 458 applied to the item, the purchase date 460, the sold condition 462 of the item, the sold location 464 of the item, the payment method 466 used to purchase the item, and whether the item is still under warranty 468. Previously completed transactions 452 may contain more or less information depending on the needs of environment 100, and should not be limited to the aforementioned information. The controller 201 (FIG. 2) may use the information in previously completed transactions 452 to facilitate a customer returning an item within environment 100, which will be described in more detail with regards to FIGS. 5 and 6A-6C.

As shown in FIG. 4B, previously completed transactions 452 stores information of the discount 458 applied to an item, as well as the purchase date 460 of the item. Some non-limiting examples of a discount 458 are a sale (e.g., a storewide sale, clearance sale, etc.), a coupon or promotional code that was applied to the item, member discount (e.g., loyalty customers receive a discount), and so forth. As shown, Item H is shown as having a discount 458 of 25%, and a purchase date 460 of Feb. 9, 2016. The controller 201 (FIG. 2) may keep track of the discount and purchase date when determining if Item H is eligible for return. For example, environment 100 may have a different return policy for a discounted item versus an item that was paid for at full price, such as discounted items sales are final or the window for return is shorter than if full price was paid for the item. Thus, controller 201 may determine the proper return procedure based on the discount 458 to apply towards the purchase date 460. For example, if a customer is attempting to return Item H on Mar. 9, 2016, the controller 201 may use the previously completed transaction 452 to determine a discount of 25% was applied and Item H was purchased on Feb. 9, 2016. If the environment 100 only accepts returns of sale items within two weeks (14 days) of the purchase date, the controller 201 can determine Item H is unavailable for return since the customer is attempting to return Item H outside of the eligible return window. In this manner, the controller 201 is able to use the discount 458 and purchase date 460 to determine whether an item is eligible for return.

Previously completed transactions 452 also stores information on the sold condition 462 of an item. Some non-limiting examples of sold condition 462 include new, open-box (i.e., an item that is effectively brand new except that the box has been opened or damaged), used, damaged, and so forth. While the sold condition 462 has been described with references to terms such as new or used, the sold condition 462 may include a numerical value such as a percentage of the original condition of the item. The controller 201 (FIG. 2) may use the sold condition 462 of an item to determine whether the item is eligible for return. For example, environment 100 may have certain condition requirements for items sold as new to be eligible for return (i.e., new in box and unused) versus items sold as used (i.e., undamaged from the sold condition). Thus, the controller 201 may use the sold condition 462 of an item to compare it to the item's current condition to determine if it is eligible for return, as will be explained in more detail with regards to FIGS. 6A-6C.

As shown in FIG. 4B, previously completed transaction 452 stores information on the sold location 464. The sold location 464 contains information relating to where an item was purchased, and may be a numerical value for the environment's 100 location, a physical address, latitude and longitude, and/or any suitable alternate method for determining a physical location of the environment 100. The controller 201 (FIG. 2) may use the sold location 464 to determine if an item is eligible for return in environment 100. The current environment 100 may differ from the environment in which the item was sold. For example, environment 100 may be a national retail chain that will accept returns for most items at any of the retail chain's locations. However, if an item is a specialty item or is only sold in specific stores, such as a sports team-branded item, environment 100 may have a policy that the sports team-branded item must be returned to a regional store where the team is based or the specific store where the item was purchased. In this manner, the controller 201 may use the sold location 464 to determine if an item is eligible for return in environment 100 based on the return policy of environment 100.

Previously completed transactions 452 also stores information on the payment method 466 a customer used to purchase an item. The payment method 466 stores the payment type used to purchase an item, and may be cash, credit card, digital currency, or any method of payment. The controller 201 (FIG. 2) may use the payment method 466 to determine how a customer should be reimbursed for their purchase. For example, the environment 100 may have a policy to reimburse customers in the same manner they purchased an item. Item G was purchased using the payment method 466 of a credit card having the digits "3344." Thus, the controller 201 can use the information of the payment method 466 to reimburse the customer on the credit card having the digits "3344." In this manner, the controller 201 can use the payment method 466 to facilitate a return based on the policy of environment 100.

Additionally, previously completed transaction 452 stores information on whether an item is under warranty 468. The controller 201 (FIG. 2) may use the information of whether an item is under warranty 468 to determine the proper method of returning an item. For example, a manufacturer of an item or the environment 100 may prefer that the customer contacts the manufacturer rather than return an item to the environment 100. The controller 201 may implement this policy using the information of whether an item was under warranty 468 to inform the customer or sales associate how to best proceed. In this manner, the controller 201 can use information on whether an item is under warranty 468 to facilitate the proper method of returning an item.

Figure 5:
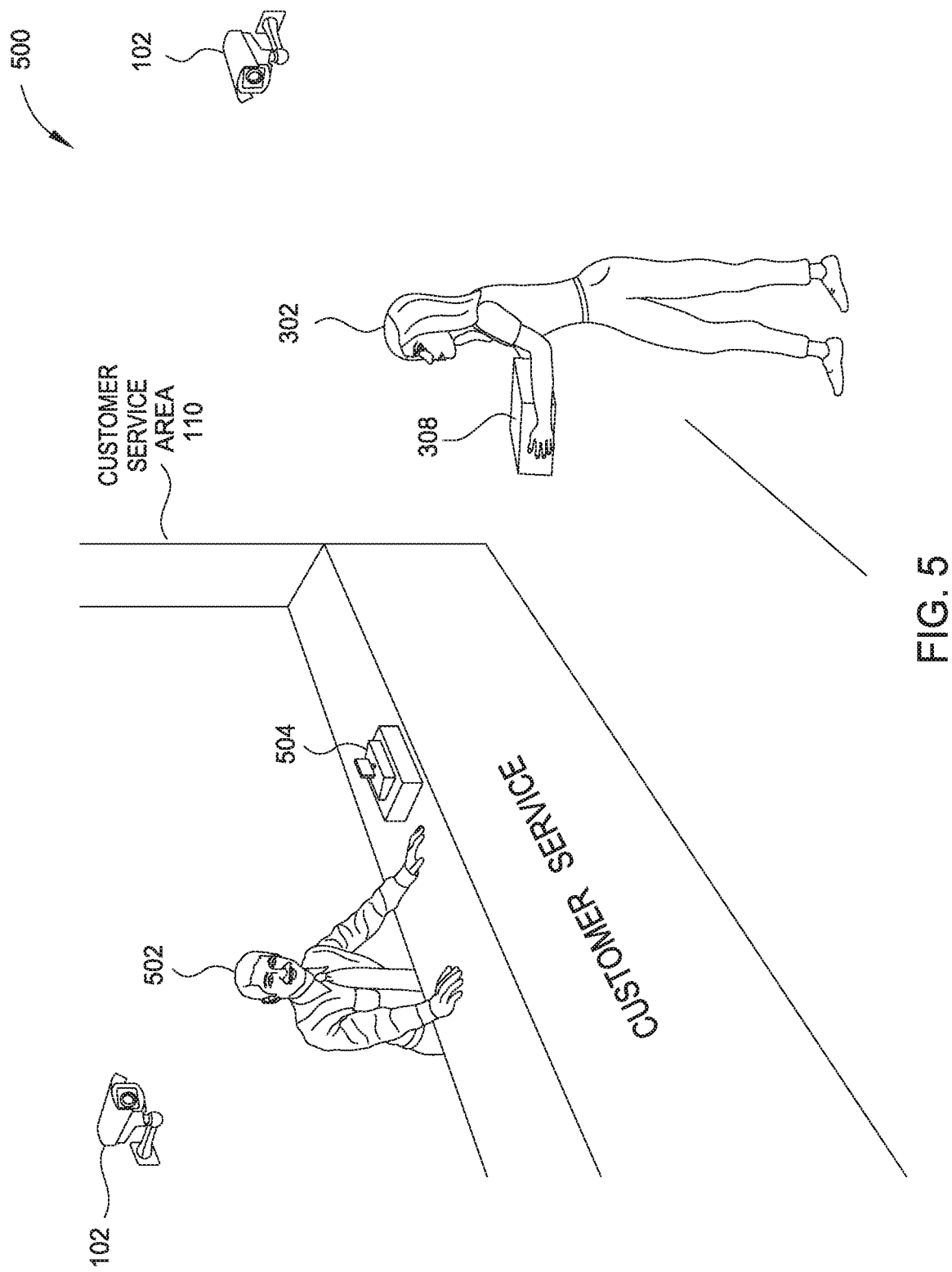
FIG. 5 illustrates an exemplary return within an environment, according to one embodiment.

Turning to FIG. 5, an exemplary return of an item within the environment 100 is illustrated, according to one embodiment. Generally, view 500 illustrates a customer 302 returning an item 308. While a single customer 302 is shown for simplicity, the techniques discussed herein may apply to multiple persons within the environment 100. If multiple customers entered environment 100 at the same time (e.g., simultaneously or within a predetermined amount of time), in some embodiments the controller 201 determines whether the customers should be associated together on a single transaction. For example, if two identified customers walk in together, the controller 201 may determine based upon a variety of factors that the two customers should be paired together, and the controller 201 subsequently pairs the two together on a single transaction. However, if an unidentified person or someone who is not a known person to the two identified customers, the controller 201 may determine based upon a variety of factors that the unidentified person should not be paired with the two identified customers. In this manner, the controller 201 is able to determine if people who are within environment 100 together should be paired or associated together.

After the customer 302 has entered the store and has been identified, as explained above with regards to FIG. 3, the controller 201 (FIG. 2) may determine customer 302 is holding item 308. Generally, the controller 201 may infer that a customer entering the environment 100 with an item intends to return said item. Thus, the controller 201 may retrieve the customer information 430 (FIG. 4B) of customer 302 and initiate and/or complete a return transaction for customer 302 when the customer 302 enters environment 100.

In another exemplary embodiment, after the customer 302 has entered the environment 100 and has been identified, as explained above, the customer 302 may move towards the customer service area 110. One of the visual sensors 102 within the environment 100 is oriented to acquire image information including the customer 302 and the item 308, which is used by the controller 201 (FIG. 2) to determine whether customer 302 is moving towards the customer service area 110. The movement toward customer service area 110 may be used by the controller to infer that the customer 302 intends to return item 308. Upon determining the customer 302 is moving towards the customer service area 110, the controller 201 may retrieve the customer information 430 (FIG. 4B) of customer 302 to initiate a return transaction for the customer 302. In this manner, the controller 201 retrieves the customer information 430 when the customer heads towards the customer service area 110, instead of at the time the customer entered environment 100.

In one exemplary embodiment, upon retrieving the customer information 430 (FIG. 4B), controller 201 (FIG. 2) sends the previously completed transactions 452 of the customer (FIG. 4B) in real-time to the customer service device 504 via the network 206 (FIG. 2). Customer service device 504 may be any type of electronic device such as a computer, a cash register, a handheld electronic device such as a smartphone or tablet, and so forth. Customer service device 504 may provide a notification to employee 502 that the customer service device 504 has obtained previously completed transactions 452 for customer 302 who is approaching the customer service area 110. Thus, the employee 502 may have all the information needed to return item 308 before the customer 302 arrives at the customer service area 110 so as to facilitate a faster return process.

Upon customer 302 arriving at the customer service area 110, the employee 502 may process the return according to the policies of environment 100. That is, the employee 502 may ensure the item 308 is in the proper condition, returned in the proper time frame, and so forth. After the employee 502 has verified the necessary information, the employee 502 processes the return and reimburses customer 302 for item 308. The employee 502 may then update returned inventory data 252 (FIG. 2) using customer service device 504. In this manner, customer 302 may simply walk up to the customer service area 110, provide the item 308 to the employee 502, and once the employee 502 verifies the conditions for return of item 308 are satisfied, customer 302 may leave after receiving the reimbursement for item 308.

In one exemplary embodiment, upon retrieving the customer information 430 (FIG. 4B), the controller 201 (FIG. 2) determines from the previously completed transactions 452 (FIG. 4B) that item 308 is eligible for return. That is, controller 201 applies the policies of environment 100 to the data stored in the previously completed transactions 452 to determine whether item 308 is eligible for return. Upon determining that item 308 is eligible for return, controller 201 provides a notification to the customer service device 504 that item 308 is eligible for return so that the employee 502 may only have to inspect the condition of item 308 to ensure it is able to be returned. Upon the employee 502 verifying the condition of item 308 to the controller 201, controller 201 completes the return and reimburses customer 302. To complete the return in one exemplary embodiment, transaction manager module 230 (FIG. 2) removes the item being returned from customer 302's previously completed transactions 452. The controller 201 and/or the transaction manager module 230 (FIG. 2) notify the store inventory manager module 232 (FIG. 2) to add item 308 to the returned inventory 414 (FIG. 4A). The controller 201 and/or the transaction manager module 230 may use the payment method 466 (FIG. 4B) used to purchase the item to reimburse customer 302 the purchase price 455 (FIG. 4B) of item 308.

In another exemplary embodiment, item condition module 228 (FIG. 2) determines the condition of item 308 as customer 302 approaches the customer service area 110. Item condition module 228 may use a weighted score to determine the condition of the item 308, as will be explained in more detail with regards to FIGS. 6A-6C. Once the item condition module 228 has determined the condition of the item 308, the controller 201 may compare the determined condition to the sold condition 462 (FIG. 4B) of item 308 to verify item 308 is within environment 100's return standards. Once the controller determines item 308 is eligible for return, the controller 201 may automatically add item 308 to the returned inventory 414 (FIG. 4A), remove item 308 from customer 308's previously completed transactions 452 (FIG. 4B), and provide a reimbursement to customer 302. The controller 201 may then send a notification to the customer service device 504 that the item 308 has been successfully returned so that employee 502 can verify to customer 302 item 308 has been returned. In this manner, customer 302 is able to return item 308 automatically in real-time within environment 100 without the need for human interaction.

Figure 6B:
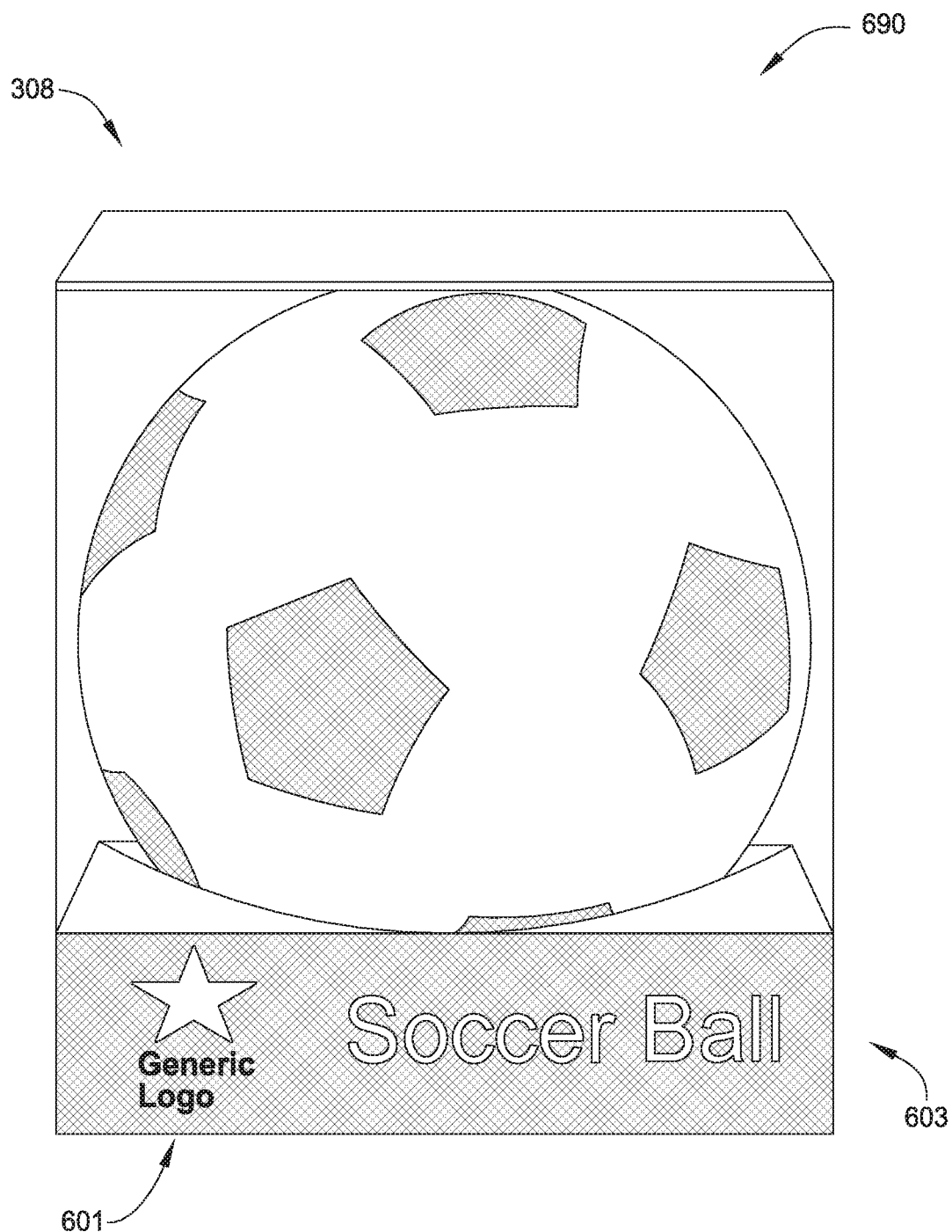

Turning to FIGS. 6A-6C, an exemplary return of an item within an environment is illustrated, according to one embodiment. In FIG. 6A, view 600 generally illustrates the controller 201 of FIG. 2 returning an item 308 for customer 302 within environment 100. As shown, customer 302 has already entered the environment 100 carrying item 308 and has been identified as described regarding FIG. 3. In view 600, a single customer 302 is shown for simplicity, but the techniques discussed herein may apply to multiple persons within the environment 100. In an exemplary embodiment, as customer 302 moves towards return zone 112, at least one of the visual sensors 102 is oriented to acquire image information 240 (FIG. 2) including the customer 302 and item 308. The acquired image information may be used by the controller 201 to determine customer 302 is entering return zone 112 and that customer 302 wants to initiate a return of item 308. The controller 201 may determine the identification of item 308, the condition of item 308, and whether item 308 is returnable, which will be described in more detail below with regards to FIG. 6C. The identity and condition of item 308 may be determined when customer 302 enters environment 100, when customer 302 enters the return zone 112, when the customer approaches environment 100 (e.g., in the parking lot of environment 100), or at any location inside or outside environment 100. To determine the identity and condition of item 308, the controller may use the image information 240 provided by the visual sensors 102 to determine various characteristics of item 308. Once controller 201 determines that item 308 is returnable, controller 201 may complete the return of item 308 for customer 302 and provide a refund to customer 302. In this manner, controller 201 allows customer 302 to return item 308 without the need to interact with an employee of environment 100.

In one exemplary embodiment, controller 201 (FIG. 2) is unable to determine the identification of item 308 and/or the condition of item 308 due to the image information 240 (FIG. 2) not containing all the features of item 308. In order to properly determine the identification information, controller 201 may communicate with customer 302 to reposition item 308 so that the visual sensors 102 are able to obtain better image information. In one exemplary embodiment, the controller 201 communicates to the customer 302 via a customer device 208 (not shown). The controller 201 may provide instructions or notifications to the customer device 208, which the customer 302 may then follow to facilitate the return of the item. For example, controller 201 may instruct customer 302 to rotate item 308 to provide a different side of item 308 facing toward a visual sensor 102. The different side of item 308 may provide information that controller 201 was unable to obtain from the image information 240 that was previously captured. The controller 201 may process the return of item 308 using the newly obtained image information 240. In this manner, the controller 201 may communicate with customer 302 to facilitate the return of item 308.

In another exemplary embodiment, within return zone 112 there may be a kiosk (not shown) having a display, a communication device (e.g., a speaker, a display, etc.), a scale, and a visual sensor 102. The kiosk may have information designating the kiosk as the return location for environment 100. The customer 302 may then approach the kiosk to facilitate the return of item 308. The controller 201 may communicate with customer 302 via the kiosk in order to provide customer 302 with instructions on how to return item 308. For example, controller 201 may instruct customer 302 to show all sides of item 308 to the visual sensor 102 in order to better determine the identity and condition of item 308. The controller 201 may also instruct the customer 302 to place item 308 on the scale to determine the weight of item 308. Once controller 201 determines that item 308 is returnable, controller 201 may complete the return of item 308 for customer 302 and provide a refund to customer 302. In this manner, controller 201 may communicate with customer 302 via a kiosk to facilitate the return of item 308.

Turning to FIG. 6B, an exemplary view 690 of item 308 is shown. As illustrated in FIG. 6B, item 308 is a generic soccer ball within a container. While a single item is shown for simplicity, it is to be understood more than one item may be returned at a time. Further, while a generic soccer ball is shown, item 308 may be any item found within environment 100 such as groceries, electronics, building supplies, and so forth. As shown in view 690, item 308 has a generic logo 601 and lettering 603. The controller 201 may use the generic logo 601 and lettering 603 to identify item 308 as will be described in more detail with regards to FIG. 6C.

Turning to FIG. 6C, with reference back to FIGS. 6A and 6B, an exemplary identification of item 602, item condition 604, and item returnable 606 are illustrated. As shown in FIG. 6C, the item I.D. 608 contains item G and item 308 of FIG. 6B, which the unknown item customer 302 is attempting to return in FIG. 6A. The item identifying module 224 (FIG. 2) compares the characteristics of an unidentified item (e.g., item 308) with item information data 238 (FIG. 2) to properly identify the item. While identification of item 602 is shown with one unidentified item (e.g., item 308) and one known item (e.g., item G), in alternate embodiments the item identifying module 224 may be configured to consider more than one unidentified item and/or more than one known item. For example, the item identifying module 224 may compare the unknown item to all of the known items stored within item information data 238 to determine a match. The identification of item 602 contains values for one or more predetermined parameters such as dimensions match 610, item shape 612, item color 614, container shape 616, container color 618, graphic and lettering match 620, identification information 622, and weight 624. The item identifying module 224 uses the data within identification of item 602 to determine a match score 626 between the unidentified item and the known item.

As shown in FIG. 6C, the item identifying module 224 (FIG. 2) compares the dimensions of the unidentified item (e.g., item 308) to the dimensions of Item G to determine a dimensions match 610. The controller 201 (FIG. 2) may use the image information 240 (FIG. 2) to determine the dimensions of an item within environment 100. The controller 201 may take into account the length, width, height, and so forth of an item when determining the dimensions. Further, the dimensions of an item may be the dimensions of the container, the dimensions of the item within the container, or a combination of the two. The container of an item is the box, packaging, wrapping, and so forth surrounding an item. For example, in FIG. 6B, the container of item 308 would be the box surrounding the soccer ball. After controller 201 determines the dimensions of an unknown item, the item identifying module 224 may compare the determined dimensions of the unknown item to the item information data 238 (FIG. 2) to determine the dimensions match 610. In the example depicted in identification of item 602, the dimensions match 610 has a maximum possible score of one hundred (100). For example, item G may have the known width, length, and height (i.e., the dimensions) of 12 inches by 12 inches by 12 inches. Controller 201 may determine that item 308 has the dimensions of 12 inches by 12 inches by 8 inches. The item identifying module 224 then compares the dimensions of item 308 to item G to determine a dimensions match 610 score. As shown in FIG. 6C, the item identifying module 224 determines a dimensions match 610 score of seventy-five (75).

In addition to determining the dimension of an item, controller 201 (FIG. 2) may use the image information 240 (FIG. 2) from the visual sensors 102 to determine the item shape 612, item color 614, the container shape 616, and container color 618 of an unknown item. As shown in FIG. 6C, controller 201 determines that the item shape 612, the item color 614, the container shape 616, and container color 618 of item 308 are "spherical," "black and white," "cube," and "black," respectively. While these characteristics are represented as words (i.e., adjectives of item 308) for simplicity, the characteristics may be represented numerically (e.g., as a lookup number in a data table, a red-green-blue (RGB) value, etc.), graphically (e.g., as an image to be compared), or in any suitable manner. The controller 201 updates the identification of item 602 to reflect the determined item shape 612, item color 614, the container shape 616, and container color 618 of item 308.

As shown in FIG. 6C, the item identifying module 224 (FIG. 2) compares the graphics and lettering of an unidentified item (e.g., item 308) to the graphics and lettering of Item G to determine a graphic and lettering match 620 score. The controller 201 (FIG. 2) may use the image information 240 (FIG. 2) to determine the graphic and lettering of an item within environment 100. Some non-limiting examples of graphics the controller 201 may take into account are trademarks, pictures, logos, designs, patterns, and so forth. Some non-limiting examples of the characteristics the controller 201 may take into account for lettering include the font, color, size, and so forth.

In one exemplary embodiment, the controller 201 (FIG. 2) may provide the information relating to the graphics and lettering to item identifying module 224 (FIG. 2). The item identifying module 224 may compare the relative placement of graphics and lettering on an item to determine the graphic and lettering match 620 score. For example, as shown in FIG. 6C with reference to FIG. 6B, item 308 has a generic logo 601 located on the bottom left hand corner of item 308's container. Further, item 308 has lettering 603 which says "Soccer Ball" across the majority of the bottom portion of item 308's container. The item identifying module 224 takes into account the placement of generic logo 601 and lettering 603 when determining the graphic and lettering match 620 score. That is, the item identifying module 224 compares the placement of the graphics and lettering of item 308 to the placement of the graphics and lettering of item G to determine the graphic and lettering match 620 score. As shown in FIG. 6C, the item identifying module 224 determines the graphic and lettering match 620 score between item 308 and item G is eighty-nine (89). Thus, the item identifying module 224 uses the graphic and lettering match 620 score as a factor when determining the match score 626.

As shown, identification of item 602 contains data on identification information 622 of an item. The identification information 622 may be any of the identifiers described above such as identifying codes, identifying tags, identifying labels, and/or an electronic identifier. The controller 201 (FIG. 2) may use the image information 240 from the visual sensors 102 to determine the identification information 622 for an item. If the identification information 622 is an electronic identifier, the controller 201 may also use electronic communication means to determine the identification information 622. As shown in FIG. 6C, identification of item 602 does not contain identification information 622 for item 308, which is represented by NA for "not applicable." That is, controller 201 was unable to determine identification information 622 for the item 308. As shown in FIG. 6B, item 308 does not have any identification information 622 in view 690. Thus, the controller 201 determined the identification information 622 is NA. In another exemplary embodiment, controller 201 may communicate with customer 302 to rotate item 308 so as to provide a different view (e.g., a different side of item 308) which may contain identification information 622. The controller 201 may communicate with the customer via the customer's device 208 (FIG. 2), a speaker, a display, or any suitable communications means.

As shown, identification of item 602 contains data on the weight 624 of an item. In one exemplary embodiment, there is a scale in return zone 112 that customer 302 may place item 308 on. The controller 201 (FIG. 2) may communicate with the scale to determine the weight 624 of item 308. The controller 201 may update the identification of item 602 to reflect the determined weight 624 of the item. For example, as shown in FIG. 6C, item 308 has a weight 624 of 12.0 ounces. The item identifying module 224 (FIG. 2) may compare the weight 624 of item 308 to the weight 624 of item G when determining the match score 626. In this manner, the item identifying module 224 may take into account the weight 624 of an item when attempting to identify said item.

The item identifying module 224 (FIG. 2) may use the dimensions match 610, item shape 612, item color 614, container shape 616, container color 618, graphic and lettering match 620, identification information 622, and weight 624 to determine a match score 626 between an unknown item (e.g., item 308) and one or more known items (e.g., item G). As shown, a higher match score 626 correlates to an increased likelihood the unidentified item is the known item. In the example depicted in identification of item 602, the match score 626 has a maximum possible score of one hundred (100). The match score 626 may be determined using any suitable arithmetic and/or logical functions, such as a weighted sum, comparing the parameter values with thresholds to produce a binary decision for each, fuzzy logic, and so forth. The item identifying module 224 may compare the match score 626 with a threshold value to determine a match exists between the unknown item and the known item. For example, a match score 626 over seventy-five (75) indicates that the unknown item and the known item are the same. Thus, the match score 626 represents the probability that the unknown item is the known item. That is, in FIG. 6C the match score 626 represents the likelihood that item 308 is in fact item G.

In one exemplary embodiment, item identifying module 224 (FIG. 2) uses a weighted score of the data within identification of item 602 to determine the match score 626. For example, the item identifying module 224 may determine an exact match of identification information 622 is a very strong indicator that the two items are the same. However, not having an exact match of the identification information 622 does not mean there will not be a high match score 626 as shown in FIG. 6C. Rather, the item identifying module 224 may recognize that by having a graphic and lettering match 620 that is high (e.g., anything over seventy-five (75) is a strong indicator of a match), the item identifying module 224 may determine the two items are most likely the same even though there is not an identification information 622 match. That is, the item identifying module 224 may take into account the fact that it is extremely unlikely that two items would have almost the exact same graphics and lettering placement, without being the same item. Further, the item identifying module 224 may determine there is a strong match between the two items because the item color 615, container shape 616, and container color 618 are exact matches between the two items. Thus, by weighing the various parameters, the item identifying module 224 determines the two items are likely the same and updates the identification of item 602 to reflect this. That is, the item identifying module 224 determines the match score 626 between item 308 and item G is ninety-five (95), which indicates a very high likelihood that item 308 is in fact item G. In this manner, the controller 201 is able to accurately identify an item within environment 100.

While the above example illustrates how controller 201 (FIG. 2) is capable identifying the type of item a customer brings into environment 100, controller 201 may also be capable of identifying specific items within environment 100. For example, controller 201 may recognize that while item 308 has been identified as a soccer ball (i.e., item G), item 308 is a specific soccer ball. That is, while there may be twenty (20) soccer balls within environment 100, controller 201 may determine there is only one (1) item 308. Thus, controller 201 is able to identify specific items within environment 100 such that controller 201 recognizes that customer 302 is attempting to return the specific item that is item 308, and not a generic soccer ball. In this manner, controller 201 is able to differentiate between a generic item and the specific item within environment 100. For example, controller 201 determines that item 308 (i.e., the soccer ball) is the exact same item as item G in previously completed transactions 452 (FIG. 4B). Thus, controller 201 may use the information stored in previously completed transaction 452 for item G to facilitate the return of item 308.

As shown in FIG. 6C, an exemplary item condition 604 is illustrated. The item condition 604 contains values for one or more predetermined parameters such as the item I.D. 628, the container condition 630, item functioning 632, item damage 634, missing parts 636, accessories present 638, item expired 640, item weight 642, identification information 644, and known customer 646. The item condition module 228 (FIG. 2) uses the data within item condition 604 to determine a condition score 648 of an item within the environment 100. While item condition 604 is shown with two items for simplicity, in alternate embodiments the item condition 604 may contain data for one item or more than two items. The controller 201 (FIG. 2) may use the condition score 648 to determine whether an item is returnable within environment 100.

The item I.D. 628 contains data on specific items throughout environment 100. As shown, item I.D. 628 contains two items item 308 and item BR. In one exemplary embodiment, item 308 is the same item that was identified by the item identifying module 224 (FIG. 2) using identification of item 602. While the item identifying module 224 determines what type of item customer 302 is attempting to return (e.g., a soccer ball), item condition module 228 (FIG. 2) determines the condition of the specific item customer 302 is attempting to return. Thus, the item I.D. 628 differs from item I.D. 608 in that item G is a generic soccer ball while item 308 and item BR are specific individual items within environment 100.

Item condition 604 contains data on the container condition 630 of items within environment 100. As explained above, the container of an item is the box, packaging, wrapping, and so forth surrounding an item. For example, in FIG. 6B, the container of item 308 would be the box surrounding the soccer ball. The item condition module 228 may use image information 240 (FIG. 2) from visual sensors 102 to determine a score representing the condition of the container. The item condition module 228 (FIG. 2) may determine the container condition 630 using any suitable arithmetic and/or logical functions, such as fuzzy logic, a weighted some, and so forth. In one exemplary embodiment, each container starts off with a perfect score of one hundred (100). The item condition module 228 may then subtract points from the score based on how much damage is identified from the image information 240. For example, the item condition module may subtract points from the container condition 630 score based on damage to the container such as five (5) points if a tear or hole is identified in the container, ten (10) points if the container seal is broken, and so forth. The item condition module 228 may subtract more or less points based upon the relative size of the damage, such that a large hole subtracts more points compared to a small hole. As shown, the item condition module 228 determined that item 308 has a container condition 630 score of eighty-five (85), which may be due to several holes in the container of item 308. In this manner, the item condition module 228 may determine the condition of the container for an item.

Item condition 604 contains data on how well an item is functioning 632. In one exemplary embodiment, the item condition module 228 (FIG. 2) may determine how an item is functioning 632 from analyzing image information 240 (FIG. 2) from the visual sensors 102. For example, referring back to FIG. 6B, the item condition module 228 may determine that item 308 is functioning normally because the soccer ball is fully inflated. Thus, the item condition module 228 may assign the maximum item function 632 score of one hundred (100).

In another exemplary embodiment, controller 201 (FIG. 2) may communicate with a customer within environment 100 to determine the item functioning 632 score. For example, item BR may be an electronic device that a customer is returning because item BR will not turn on. Thus, the item condition module 228 may assign an item functioning 632 score of sixty-five (65) to item BR. However, the item condition module 228 may not be able to determine whether item BR is functioning from only analyzing image information 240. For example, if item BR is wholly located within an opaque container, the item condition module 228 may not be able to determine the item functioning 632 score. The controller 201 may determine additional information is needed from the customer, and may acquire additional information by communicating via a customer device 208 (FIG. 2) associated with the customer, via a kiosk as discussed above, and/or may notify an employee within environment 100 that additional information is needed to determine the item functioning 632 score of item BR. Once the controller 201 has acquired the additional information required, controller 201 may provide the additional information to the item condition module 228 in order to determine the item functioning 632 score. In this manner, the item condition module 228 is able to determine how well an item is functioning 632 and updates the item condition 604 appropriately.

Item condition 604 also contains item damage 634. In one exemplary embodiment, the item condition module 228 (FIG. 2) may determine the amount of damage that has occurred to an item from analyzing image information 240 (FIG. 2) from the visual sensors 102. A few non-limiting examples of item damage include scuffs, abrasions, broken parts, rot (e.g., rotten food, rotten wood, etc.), and so forth. For example, referring back to FIG. 6B, the item condition module 228 may determine that item 308 (i.e., the soccer ball) has a minor scuff. Thus, the item condition module 228 may assign five (5) points out of a possible one hundred (100) to the item damage 634 score to reflect the minimal amount of damage as shown in item condition 604. In this manner, the controller 201 is capable of determining the amount of damage an item has received.

Item condition 604 contains data on missing parts 636 and missing accessories 638. The item condition module 228 (FIG. 2) may determine if an item is missing parts 636 and/or missing accessories 638 by analyzing image information 240 (FIG. 2) from the visual sensors 102. For example, item BR may be a doll. The item condition module 228 may determine that item BR (i.e., the doll) is missing an appendage such as an arm or leg. The item condition module 228 may update missing parts 636 to reflect the missing appendage by assigning a value of twenty (20) to the missing parts 636 score. In this exemplary embodiment, a score of zero (0) represents that no parts are missing, while a score of one hundred (100) represents that all the parts missing.

Further, the item condition module 228 may determine that item BR (i.e., the doll) is missing one of the clothing outfits originally packaged with item BR. The item condition module 228 updates missing accessories 638 to reflect this by assigning a value of yes (Y). While missing accessories 638 is shown as having a "yes" or "no" value, missing accessories 638 may be a numerical or other value representing if accessories are missing from an item.

Item condition 604 contains data on whether an item has expired 640. The item condition module 228 (FIG. 2) may use the purchase date 460 (FIG. 4B) of a previously completed transaction 452 (FIG. 4B) to determine if an item is expired 640. For example, if an item is vegetable produce that is generally fresh for two weeks from the purchase date, the item condition module 228 may compare the purchase date 460 of the produce to the current date to determine if the vegetable produce has expired. The item condition module 228 may then update the item expired 640 data to reflect that the item has expired. As shown in item condition 604, the item expired 640 data has a not applicable (NA) value to represent that item 308 and item BR do not expire. Thus, the item condition module 228 is capable of determining whether an item has expired 640.

Item condition 604 contains data on item weight 642. In one exemplary embodiment, there is a scale in return zone 112 that customer 302 may place item 308 on. The controller 201 may communicate with the scale to determine the weight 642 of item 308. The controller 201 may update the item condition 604 to reflect the determined item weight 642. The item weight 642 may be used by the item condition module 228 to determine if an item weighs more or less than a standard amount. In one exemplary embodiment, the item condition module 228 may compare the determined item weight 642 to the standard item weight contained in item information data 238 (FIG. 2). If an item weight 642 is less than the standard weight, then a part of the item is missing. For example, if a customer is attempting to return a box of cereal, item condition module 228 may not be able to determine from a visual inspection of the exterior of the box whether any cereal has been removed. However, if the item weight 642 is significantly less than the standard weight, item condition module 228 may determine some of the cereal has been consumed. The item condition module 228 may then factor the loss of cereal in determining the condition of the box of cereal. In this manner, the item condition module 228 may use the item weight 642 as a factor in determining the condition score 648 of an item.

Item condition contains data on identification information 644. The identification information 644 may be any of the identifiers described above such as identifying codes, identifying tags, identifying labels, and/or an electronic identifier. The controller 201 (FIG. 2) may use the image information 240 from the visual sensors 102 to determine the identification information 644 for an item. If the identification information 644 is an electronic identifier, the controller 201 may also use electronic communication means to determine the identification information 644. In one exemplary embodiment, the controller 201 uses the identification information 644 to track condition information for items within environment 100. For example, the controller 201 may use the identification information 644 to determine that a large number of items with the "363625" identification information 644 have been returned in the past month with item damage 634. This information may be valuable to environment 100 to determine if the items being sold are defective or if the quality of the items does not meet environment 100's standards. Thus, by keeping data on the identification information 644 in item condition 604, the controller 201 may be able to provide beneficial data analytics for environment 100.

Item condition 604 also contains information on whether a person attempting to return an item is a known customer 646. In one exemplary embodiment, the controller 201 (FIG. 2) may use the known customer 646 data to help facilitate the return of an item or provide analytical information to environment 100. For example, if a known customer 646 has a history of returning items in a damaged state, the controller 201 may require a higher threshold for the condition score 648 in order to return an item than is typically required under environment 100's return policies. In this manner, the controller 201 is capable of recognizing trends using known customer 646 data stored in item condition 604.

Further, controller 201 (FIG. 2) may use the known customer 646 data to access the previously completed transactions 452 (FIG. 4B) of the known customer 646. The controller 201 may then use the information stored in the previously completed transactions 452 to update various parameters within item returnable 606. In this manner, the controller 201 may use the previously completed transactions 452 to facilitate the return of an item.

The item condition module 228 (FIG. 2) may use the determined values for the one or more predetermined parameters such as the container condition 630, item functioning 632, item damage 634, missing parts 636, accessories present 638, item expired 640, item weight 642, identification information 644, and known customer 646 to determine a condition score 648. In one exemplary embodiment, the condition score 648 may be a weighted score where the different parameters have different impacts on the condition score 648. In this manner, the item condition module 228 determines the condition of an item.

As shown in FIG. 6C, item returnable 606 stores data on one or more predetermined parameters for determining whether an item is returnable within environment 100. As illustrated, item returnable 606 stores data on item identification 650, known customer 642, receipt 654, within return period 656, purchase location 658, return reason 660, discount 662, item condition score 664, sold condition 668, and under warranty 670. The controller 201 may use the aforementioned parameters to calculate a return score 672 for an item. In one exemplary embodiment, the controller 201 determines if an item is returnable based on the return score. The return score 672 may be determined using any suitable arithmetic and/or logical functions, such as a weighted sum, comparing the parameter values with thresholds to produce a binary decision for each, fuzzy logic, and so forth.

The receipt 654 represents data on whether a customer has a receipt for the item being returned. In one exemplary embodiment, the controller 201 (FIG. 2) may use the image information 240 (FIG. 2) to determine whether a customer has receipt. The controller 201 may update whether an item is within the return period 656 based on the purchase date 460 (FIG. 4B) and environment 100's return policy. The controller 201 may communicate with a customer to determine the return reason 660. For example, controller 201 may communicate via the customer device 208 (FIG. 2) or a kiosk as described above to inquire as to why the customer is returning the item. The discount 662 represents whether a discount was provided on the item at the time of purchase. The item condition score 664 is the condition of the time being returned, and in one exemplary embodiment is the condition score 648 from item condition 604. The sold condition 668 is the condition of the item at the time it was sold such as new, open-box, used, and so forth. The under warranty 670 provides information on whether the item is under a manufacturer's warranty, which may impact whether environment 100 returns the item or requests the customer contact the manufacturer. Based on these parameters stored in item returnable 606, the controller 201 determines a return score 672 for an item. In one exemplary embodiment, if the return score 672 is above a predetermined threshold, the controller 201 facilitates the return and refunds the customer as previously described. In this manner, the controller 201 determines whether an item is returnable based on a return score 672.

Figure 7A:
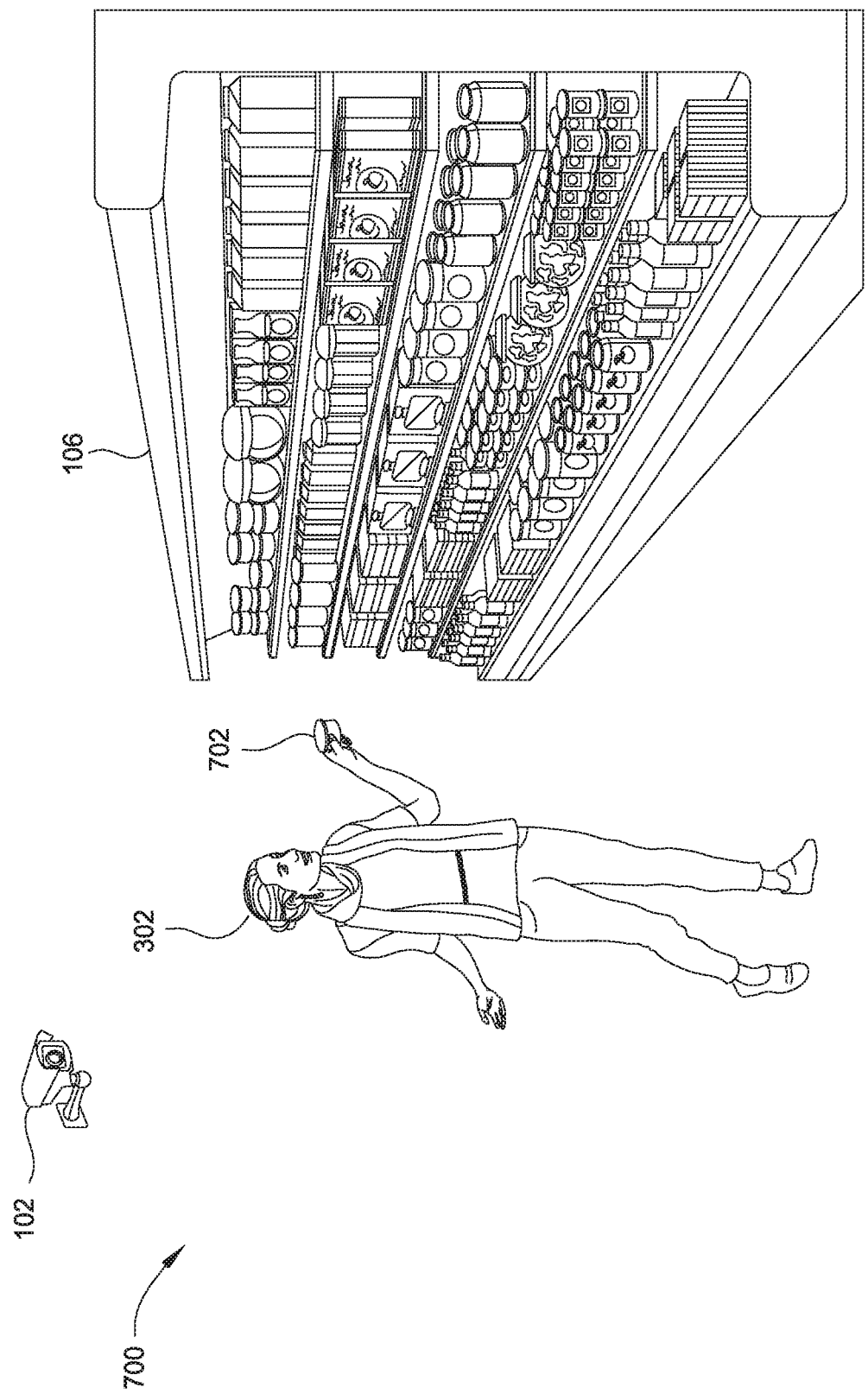

Turning to FIGS. 7A-7B, an exemplary return of an item within an environment is illustrated, according to one embodiment. In FIG. 7A, view 700 generally illustrates the controller 201 (FIG. 2) providing instructions to customer 302 to return item 702 to a display stand 106 within environment 100. As shown, customer 302 has already entered the environment 100 carrying item 702 and has been identified as described regarding FIG. 3. In view 700, a single customer 302 is shown for simplicity, but the techniques discussed herein may apply to multiple persons within the environment 100. As customer 302 enters environment 100, controller 201 determines customer 302 is attempting to return item 702. Instead of having the customer 302 return item 702 to a customer service area 110 (FIG. 5) or a return zone 112 (FIG. 6A), the controller 201 may provide instructions to customer 302 so as to have item 702 returned to the proper location on a display stand 106. In some embodiments, the controller 201 may incentivize customers to complete the return of return-eligible items directly to a display stand 106 by offering rewards (e.g., points, discounts, etc.) to the customers for the effort of returning the item.

In one exemplary embodiment, controller 201 (FIG. 2) determines the identity and condition of item 702 as described above with regards to FIG. 6C. If item 702 is an item that may be easily returned to a display stand and item 702's condition meets the predetermined requirements (e.g., unopened, unused, no visible damage, etc.), the controller 201 determines that item 702 is eligible to be returned directly to a display stand 106. In one exemplary embodiment, the item condition module 228 (FIG. 2) determines the condition of the item as explained with regards to FIG. 6C. The controller 201 may communicate to customer 302 via a customer device 208 (FIG. 2), a display, a speaker, or any communication that item 702 may be returned directly to the shelf. The customer 302 may communicate with the controller 201 using one of the aforementioned communication methods that customer 302 will return item 702 to the display stand 106, and the controller 201 then provides directions guiding customer 302 to the proper display stand 106. Alternatively, controller 201 may provide directions to customer 302 without waiting for communication from customer 302.

In one exemplary embodiment, the controller 201 (FIG. 2) may analyze the image information 240 (FIG. 2) from the visual sensors 102 to determine the exact location of customer 302 within environment 100. Further, controller 201 may determine the location of customer 302 in real-time so that the controller 201 may provide turn by turn directions to customer 302 to the proper display stand 106. That is, controller 201 may be capable of mapping a route from customer 302's current position to the proper display stand 106. Further, the controller 201 may be capable of adjusting the map or directions in real-time based on customer 302's location. For example, if customer 302 accidentally turns down the wrong aisle in environment 100, the controller 201 may recognize that the directions for customer 302 need to be updated in order to accurately direct customer 302 to the proper display stand. In this manner, the controller 201 is able to provide directions in real-time, while taking into account any deviations a customer may make while traveling to display stand 106. While the previous example uses visual image information to determine the location of customer 302, any geolocation method may be used such as a Global Positioning System (GPS), frequency triangulation, and so forth.

In FIG. 7B, view 750 illustrates customer 302 interacting with the display stand 106. Once the customer 302 begins moving towards the display unit 106, the controller 201 (FIG. 2) may reorient or otherwise control the visual sensor 102 to better capture the customer's interaction with the display unit 106. For example, the controller 201 may recognize using the aforementioned image processing module 220 (FIG. 2) or the behavior classification module 222 (FIG. 2) that the customer 302 is stepping towards display unit 106. The controller 201 may recognize customer 302 has interacted with display stand 106, and more specifically, that customer 302 is attempting to return item 702 to display unit 106. At this point, the controller 201 may use the behavior classification module 222 to recognize that the customer 302 has placed item 702 on the display unit 106. If customer 302 placed item 702 in the wrong location, controller 201 may notify the customer 302, using one of the communication methods mentioned above, to relocate item 702 to the proper location on display unit 106. In this manner, the controller 201 may ensure that item 702 is returned to the proper location on display stand 106. The controller 201 then notifies transaction manager module 230 (FIG. 2) and store inventory manager module 232 (FIG. 2) that customer 302 has returned item 702. The transaction manager module 230 then updates the previously completed transaction 452 (FIG. 4B) associated with customer 302 to reflect the returned item. That is, the transaction manager module 232 removes the returned item from the previously completed transaction 452 as the item is no longer associated with the customer. Similarly, store inventory manager module 232 updates the returned inventory data 252 to reflect customer 302 returning item 702.

Figure 8:
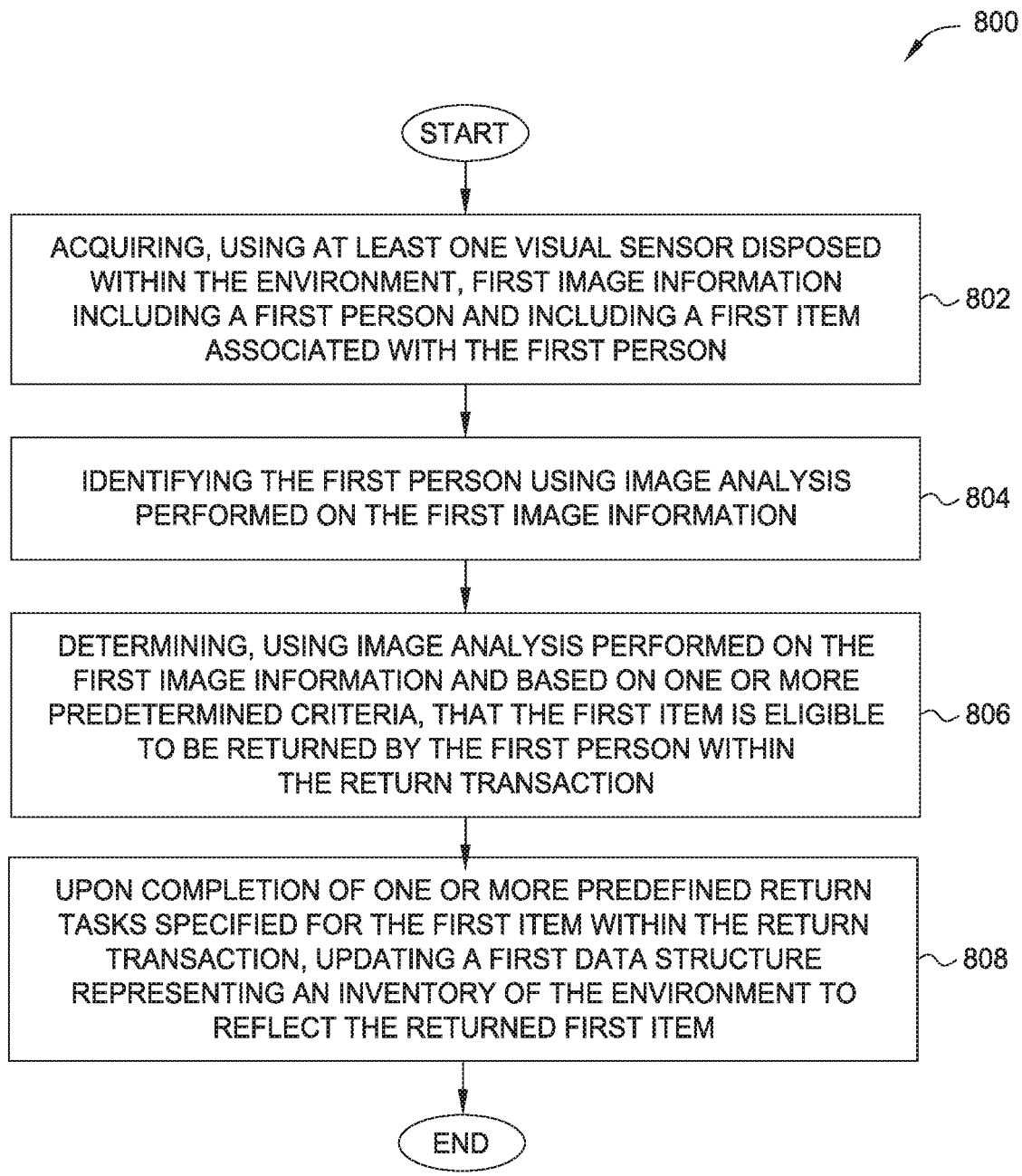
FIG. 8 illustrates a method of returning an item within an environment with a return zone, according to one embodiment.

FIG. 8 illustrates a method of returning within an environment, according to one embodiment. The method 800 may be used in coordination with the systems and environments described herein.

Method 800 begins at block 802, where at least one visual sensor disposed within the environment acquires first image information including a first person and a first item associated with the first person. In one embodiment, the first image information is acquired at the time the person enters the environment. In another embodiment, the first image information is acquired when the person interacts with an object within the environment. For example, at least one visual sensor may be oriented to acquire first image information upon the person entering a predefined return zone within the environment.

At block 804, the first person is identified using image analysis performed on the first image information. The identification may include an analysis of the image information to determine physical attributes of the at least one person. In another embodiment, the system may compare the physical attributes of the at least one person to persons previously known to the environment.

At block 806, whether the first item is eligible to be returned by the first person within the return transaction, based on one or more predetermined criteria, is determined using image analysis performed on the first image information. In one embodiment, the analysis of the image information includes determining the physical attributes of the first item as previously described.

At block 808, upon completion of one or more predefined return tasks specified for the first item within the return transaction, updating a first data structure representing an inventory of the environment to reflect the returned first item. In one embodiment, updating the first data structure involves adding the first time to a data structure associated with the environment to reflect the first item has been returned, as well as providing a refund to the first person. In one embodiment, the refund provided to the first person is provided by the payment method used to purchase the first item. Method 800 is completed following block 808.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method of managing a return transaction within an environment having a plurality of purchasable items, the method comprising:
    acquiring, using at least one visual sensor disposed within the environment, first image information including a first person and including a unidentified item associated with the first person;
    identifying, using one or more computer processors, the first person using image analysis performed on the first image information;
    accessing completed transaction data reflecting one or more previously completed transactions of the identified first person;
    identifying the unidentified item as a first item using image analysis performed on the first image information and one or more physical attributes of the unidentified item by:
        comparing the one or more physical attributes of the unidentified item to one or more physical attributes of a known item in the environment to generate a match score between the unidentified item and the known item; and
        determining the identification of the unidentified item based on the match score;
    generating a condition score for the first item wherein the condition score comprises one or more of an item functioning score, a missing parts score, a container condition score, or an item damage score;
    determining, based on the condition score and one or more predetermined criteria, that the first item is eligible to be returned by the first person within the return transaction, wherein determining that the first item is eligible to be returned comprises determining whether the first item is reflected in the one or more previously completed transactions;
    communicating one or more signals to cause one or more predefined return tasks to be provided to the first person; and
    upon completion of the one or more predefined return tasks specified for the first item within the return transaction, updating a first data structure representing an inventory of the environment to reflect the returned first item.

2. The computer-implemented method of claim 1, wherein the image analysis performed on the first image information comprises:
    identifying the first item as being included within predetermined item information data for the environment; and
    determining a current condition of the first item, wherein the one or more predetermined criteria comprises one or more condition criteria, and
    wherein determining that the first item is eligible to be returned comprises determining that the one or more condition criteria are met by the first item.

3. The computer-implemented method of claim 1, further comprising:
    updating a second data structure representing the one or more previously completed transactions of the first person to reflect the returned first item; and
    applying a credit for the first item to a payment type associated with the first person.

4. The computer-implemented method of claim 1, further comprising:
    determining completion of the one or more predefined return tasks using second image information including the first person and acquired using at least one visual sensor disposed within the environment,
    wherein the one or more predefined return tasks comprises movement of the first person into a return zone defined within the environment.

5. The computer-implemented method of claim 1, wherein determining that the first item is eligible to be returned further comprises at least one of:
    (1) comparing a determined current condition of the first item with an original condition of the first item at purchase,
    (2) determining that a current date is within a predetermined return period of the purchase of the first item, and
    (3) determining that the plurality of purchasable items of the environment includes items of an item type of the first item.

6. The computer-implemented method of claim 1, further comprising:
    determining, based on image analysis performed on the first image information, that the first person intends to return the first item; and
    communicating instructions for completing the one or more predefined return tasks to a computing device associated with the first person.

7. The computer-implemented method of claim 1, further comprising:
    determining that the first item is not reflected in a previously completed transaction of the first person,
    wherein determining that the first item is eligible to be returned by the first person comprises:
        determining that the first person has a predetermined association with a second person; and
        determining that the first item is reflected in at least one previously completed transaction of the second person.

8. A system for returning at least one item associated with at least one person within an environment having a plurality of purchasable items comprising:
    a plurality of visual sensors located throughout the environment; and
    a controller configured to:
        acquire, using at least one visual sensor of the plurality of visual sensors, first image information including a first person and including an unidentified item associated with the first person;
        identify the first person using image analysis performed on the first image information;
        access completed transaction data reflecting one or more previously completed transactions of the identified first person;

identify the unidentified item as a first item using image analysis performed on the first image information and one or more physical attributes of the unidentified item by:
comparing the one or more physical attributes of the unidentified item to one or more physical attributes of a known item in the environment to generate a match score between the unidentified item and the known item; and
determining the identification of the unidentified item based on the match score;
generating a condition score for the first item wherein the condition score comprises one or more of an item functioning score, a missing parts score, a container condition score, or an item damage score;
determine, based the condition score and on one or more predetermined criteria, that the first item is eligible to be returned by the first person within a return transaction, wherein determining that the first item is eligible to be returned comprises determining whether the first item is reflected in the one or more previously completed transactions;
communicate one or more signals to cause one or more predefined return tasks to be provided to the first person; and
upon completion of the one or more predefined return tasks specified for the first item within the return transaction, update a first data structure representing an inventory of the environment to reflect the returned first item.

9. The system of claim 8, wherein the image analysis performed on the first image information comprises:
identifying the first item as being included within predetermined item information data for the environment; and
determining a current condition of the first item,
wherein the one or more predetermined criteria comprises one or more condition criteria, and
wherein determining that the first item is eligible to be returned comprises determining that the one or more condition criteria are met by the first item.

10. The system of claim 8, wherein the controller is further configured to:
update a second data structure representing the one or more previously completed transactions of the first person to reflect the returned first item; and
apply a credit for the first item to a payment type associated with the first person.

11. The system of claim 8, wherein the controller is further configured to:
determine completion of the one or more predefined return tasks using second image information including the first person and acquired using at least one visual sensor disposed within the environment,
wherein the one or more predefined return tasks comprises movement of the first person into a return zone defined within the environment.

12. The system of claim 8, wherein determining that the first item is eligible to be returned further comprises at least one of:
(1) comparing a determined current condition of the first item with an original condition of the first item at purchase,
(2) determining that a current date is within a predetermined return period of the purchase of the first item, and
(3) determining that the plurality of purchasable items of the environment includes items of an item type of the first item.

13. The system of claim 8, the controller further configured to:
determine, based on image analysis performed on the first image information, that the first person intends to return the first item; and
communicate instructions for completing the one or more predefined return tasks to a computing device associated with the first person.

14. The system of claim 8, the controller further configured to:
determine that the first item is not reflected in a previously completed transaction of the first person,
wherein determining that the first item is eligible to be returned by the first person comprises:
determining that the first person has a predetermined association with a second person; and
determining that the first item is reflected in at least one previously completed transaction of the second person.

15. A computer program product to manage a return transaction within an environment having a plurality of purchasable items, the computer program product comprising:
a computer-readable storage medium having computer-readable program code embodied therewith, the computer-readable program code executable by one or more computer processors to perform an operation that includes:
acquiring, using at least one visual sensor disposed within the environment, first image information including a first person and including an unidentified item associated with the first person;
identifying the first person using image analysis performed on the first image information
accessing completed transaction data reflecting one or more previously completed transactions of the identified first person;
identifying the first item using image analysis performed on the first image information and one or more physical attributes of the unidentified item by:
comparing the one or more physical attributes of the unidentified item to one or more physical attributes of a known item in the environment to generate a match score between the unidentified item and the known item; and
determining the identification of the unidentified item based on the match score;
generating a condition score for the first item wherein the condition score comprises one or more of an item functioning score, a missing parts score, a container condition score, or an item damage score;
determining, based on one or more predetermined criteria, that the first item is eligible to be returned by the first person within the return transaction, wherein determining that the first item is eligible to be returned comprises determining whether the first item is reflected in the one or more previously completed transactions;
communicating one or more signals to cause one or more predefined return tasks to be provided to the first person; and
upon completion of the one or more predefined return tasks specified for the first item within the return transaction, updating a first data structure representing an inventory of the environment to reflect the returned first item.

16. The computer program product of claim 15, wherein the image analysis performed on the first image information comprises:
identifying the first item as being included within predetermined item information data for the environment; and
determining a current condition of the first item,
wherein the one or more predetermined criteria comprises one or more condition criteria, and
wherein determining that the first item is eligible to be returned comprises determining that the one or more condition criteria are met by the first item.

17. The computer program product of claim 15, wherein the operation further includes:
updating a second data structure representing the one or more previously completed transactions of the first person to reflect the returned first item; and
applying a credit for the first item to a payment type associated with the first person.

18. The computer program product of claim 15, wherein the operation further includes:
determining completion of the one or more predefined return tasks using second image information including the first person and acquired using at least one visual sensor disposed within the environment,
wherein the one or more predefined return tasks comprises movement of the first person into a return zone defined within the environment.

19. The computer program product of claim 15, wherein determining that the first item is eligible to be returned further comprises at least one of:
(1) comparing a determined current condition of the first item with an original condition of the first item at purchase,
(2) determining that a current date is within a predetermined return period of the purchase of the first item, and
(3) determining that the plurality of purchasable items of the environment includes items of an item type of the first item.

20. The computer program product of claim 15, wherein the operation further includes:
determining that the first item is not reflected in a previously completed transaction of the first person,
wherein determining that the first item is eligible to be returned by the first person comprises:
determining that the first person has a predetermined association with a second person; and
determining that the first item is reflected in at least one previously completed transaction of the second person.

* * * * *

UNITED STATES PATENT AND TRADEMARK OFFICE
CERTIFICATE OF CORRECTION

| | | |
|---|---|---|
| PATENT NO. | : 11,257,095 B2 | Page 1 of 1 |
| APPLICATION NO. | : 15/299208 | |
| DATED | : February 22, 2022 | |
| INVENTOR(S) | : Ankit Singh et al. | |

It is certified that error appears in the above-identified patent and that said Letters Patent is hereby corrected as shown below:

In the Drawings

On sheet 9 of 12, in Figure 6C, reference numeral 670, Line 2, delete "WARRENTY" and insert -- WARRANTY --.

In the Specification

In Column 11, Line 43, delete "(CC #)" and insert -- (CC#) --.

In the Claims

In Column 31, Line 17, in Claim 8, delete "based the" and insert -- based on the --.

Signed and Sealed this
Third Day of January, 2023

*Katherine Kelly Vidal*

Katherine Kelly Vidal
*Director of the United States Patent and Trademark Office*